(12) United States Patent
Yamaguchi et al.

(10) Patent No.: US 7,743,402 B2
(45) Date of Patent: Jun. 22, 2010

(54) DATA BROADCAST PROGRAM TRANSPORT STREAM (TS) TRANSMISSION DEVICE, RELATED METHOD, COMPUTER PROGRAM AND STORAGE MEDIUM, DISTRIBUTION DEVICE AND DISTRIBUTION SYSTEM

(75) Inventors: Koichiro Yamaguchi, Ashiya (JP); Toshiya Mori, Settu (JP); Hideki Kagemoto, Nara (JP); Akihiro Tanaka, Moriguchi (JP)

(73) Assignee: Panasonic Corporation, Osaka (JP)

( * ) Notice: Subject to any disclaimer, the term of this patent is extended or adjusted under 35 U.S.C. 154(b) by 2168 days.

(21) Appl. No.: 10/416,880

(22) PCT Filed: Apr. 5, 2002

(86) PCT No.: PCT/JP02/03421

§ 371 (c)(1),
(2), (4) Date: May 15, 2003

(87) PCT Pub. No.: WO02/082699

PCT Pub. Date: Oct. 17, 2002

(65) Prior Publication Data

US 2004/0125761 A1    Jul. 1, 2004

(30) Foreign Application Priority Data

| Apr. 5, 2001 | (JP) | ............................. 2001-107727 |
| Sep. 12, 2001 | (JP) | ............................. 2001-276329 |
| Dec. 5, 2001 | (JP) | ............................. 2001-372044 |
| Feb. 7, 2002 | (JP) | ............................. 2002-031282 |

(51) Int. Cl.
   *H04N 7/16* (2006.01)

(52) U.S. Cl. ........................ 725/144; 370/389; 370/490; 348/423.1

(58) Field of Classification Search .. 725/32, 725/34, 92–95, 115–116, 144–146; 370/389, 370/490; 348/423.1

See application file for complete search history.

(56) References Cited

U.S. PATENT DOCUMENTS 5,283,639 A    2/1994   Esch et al.

(Continued)

FOREIGN PATENT DOCUMENTS

EP    0 828 390 A2    3/1998

(Continued)

OTHER PUBLICATIONS

Association of Radio Industries and Businesses (ARIB), "Data Coding and Transmission Specification for Digital Broadcasting", ARIB Standard, B24 Version 1.2, Jun. 20, 2000, 25 Pages.

(Continued)

*Primary Examiner*—John W Miller
*Assistant Examiner*—Oschta Montoya

(57) ABSTRACT

A data broadcast program transport stream (TS) transmission device provided in a broadcast station, and for transmitting a data broadcast program TS based on a data broadcast program TS distributed over a network by another broadcast station. The data broadcast program TS transmission device stores a selection list that shows whether data broadcast program elements of the received data broadcast program are for inclusion in the data broadcast program TS of the broadcast station, and a replacement list that shows the replacement of data broadcast program elements for inclusion with local program elements produced in the broadcast station. A separation judgment unit separates TS packets from the received data broadcast program TS, refers to the selection list, and notifies the replacement execution unit of data broadcast program elements for inclusion. Furthermore, if data broadcast program elements judged for inclusion are shown for replacement in the replacement list, the separation judgment unit sends a replacement instruction to the replacement execution unit. The replacement execution unit reads the local program elements indicated in the replacement instruction from the program element storage unit, generates TS packets, and outputs the generated TS packets together with selected TS packets to a multiplexing device as the data broadcast program TS of the broadcast station.

8 Claims, 25 Drawing Sheets

U.S. PATENT DOCUMENTS

| | | |
|---|---|---|
| 2004/0125761 A1 | 7/2004 | Yamaguchi et al. |
| 2006/0041921 A1* | 2/2006 | Hane .......................... 725/117 |

FOREIGN PATENT DOCUMENTS

| | | |
|---|---|---|
| EP | 0 944 249 | 9/1999 |
| EP | 0 967 804 | 12/1999 |
| EP | 1 073 225 A1 | 1/2001 |
| EP | 1 104 128 A1 | 5/2001 |
| JP | 09-284761 | 10/1997 |
| JP | 11-112573 | 4/1999 |
| JP | 11-112944 | 4/1999 |
| JP | 11146380 | 5/1999 |
| JP | 11-187310 | 7/1999 |
| JP | 11-341492 | 12/1999 |
| JP | 11355224 | 12/1999 |
| JP | 2000-013767 | 1/2000 |
| JP | 2000-083064 A | 3/2000 |
| WO | 96/08923 | 3/1996 |
| WO | 97/49241 | 12/1997 |
| WO | 00/42724 | 7/2000 |
| WO | WO 00/74279 | 7/2000 |
| WO | WO 02/082699 | 10/2002 |

OTHER PUBLICATIONS

Kitao, Nobuo et al., "Digital Terrestrial TV Broadcasting Multimedia Experiments," Matsushita Technical Journal vol. 46, No. 6, Dec. 2000, pp. 53-57 (w/English Abstract).

Toshiya Mori et al., "End-to-End System Architecture for BS Digital Data Broadcasting Service," Matsushita Technical Journal, vol. 46, No. 6, Dec. 2000, pp. 9-18 (w/English Abstract).

Shimoda, Shigeru, "Basic Concept and Technologies Underlying Effective Production in Multimedia Era," NHK Science and Technical Research Laboratories, Aug. 1999, No. 57, pp. 1-12 (w/English Abstract).

Tohru Ishikawa et al., "BS Data Broadcasting Service Systems," vol. 54, No. 1, pp. 47-53 (2000), (w/Verification of Translation, dated Dec. 21, 2004 by David Bonnitcha).

* cited by examiner

FIG.2

201 Net Distribution List

| Data Broadcast Program Name | PID | Distribution Target |
|---|---|---|
| Weather Information | 100 | Second Broadcast Station |
| | 101 | Third Broadcast Station |
| | .. | .. |
| | | Second Broadcast Station |
| .. | .. | .. |

301  Data Broadcast Program Content Information

| Data Broadcast Program Name | PID | Module Name | Resource Name | Broadcast Period |
|---|---|---|---|---|
| Weather Information | 100 | 0000 | INDEX.BML | 2001.1.1 8:00:00 ~2001.1.1 9:00:00 |
| | 100 | 0001 | NATIONAL.BML | 2001.1.1 8:00:00 ~2001.1.1 9:00:00 |
| | 100 | 0001 | NATIONAL_MAP.PNG | 2001.1.1 8:00:00 ~2001.1.1 9:00:00 |
| | 101 | 0010 | INTERNATIONAL.BML | 2001.1.1 8:00:00 ~2001.1.1 9:00:00 |
| ... | ... | ... | ... | ... |

401
Selection List

| Data Broadcast Program Name (402) | Broadcast Period (403) | PID (404) | Selection Flag (405) |
|---|---|---|---|
| Weather Information | 2001.1.1 8:00:00 ~2001.1.1 9:00:00 | 100 | 1 |
| | 2001.1.1 8:00:00 ~2001.1.1 9:00:00 | 101 | 1 |
| . . . | . . . | . . . | . . . |

FIG.7

Selection List 701

| Data Broadcast Program Name | Broadcast Period | PID | Selection Flag |
|---|---|---|---|
| Weather Information | 2001.1.1 8:00:00 ~2001.1.1 9:00:00 | 100 | 1 |
| | 2001.1.1 8:00:00 ~2001.1.1 9:00:00 | 101 | 0 |
| .. | .. | .. | .. |

FIG.10

1001 Replacement List

| Data Broadcast Program Name | Broadcast Period 1003 | PID 1004 | Module Name 1005 | Resource Name (Pre-replacement) 1006 | Resource Name (Post-replacement) 1007 |
|---|---|---|---|---|---|
| Weather Information | 2001.1.1 8:00:00 ~2001.1.1 9:00:00 | 101 | 0010 | | |
| | 2001.1.1 8:00:00 ~2001.1.1 9:00:00 | 100 | 0001 | NATIONAL.BML | LOCAL.BML |
| | 2001.1.1 8:00:00 ~2001.1.1 9:00:00 | 100 | 0001 | NATIONAL_MAP. PNG | LOCAL_MAP. PNG |
| .. | .. | .. | .. | .. | .. |

1002

FIG.11
PID 101
Module 0010
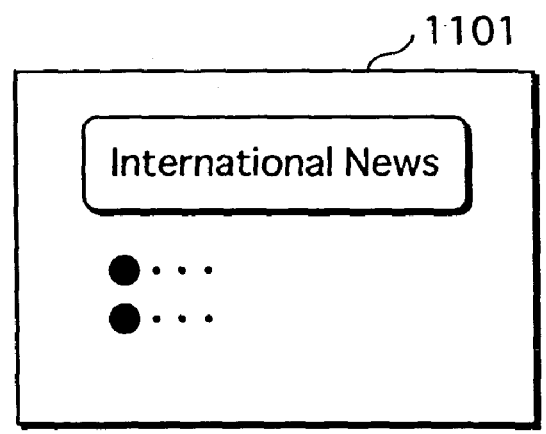
PID 100
Module 0001
Resource LOCAL.BML
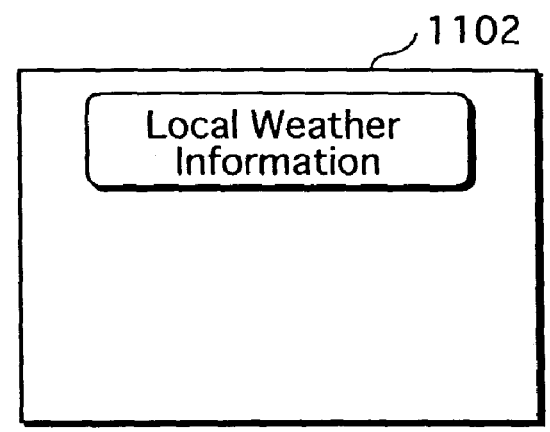
PID 100
Module 0001
Resource LOCAL_MAP.PNG
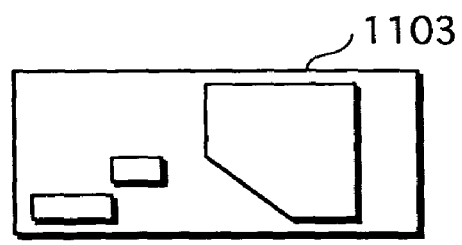

FIG.14

1401 Supplementary List

| Data Broadcast Program Name | Broadcast Period | PID | Module Name | Resource Name |
|---|---|---|---|---|
| Weather Information | 2001.1.1 8:00:00 ~2001.1.1 9:00:00 | 100 | 0001 | CM.BML |
| | 2001.1.1 8:00:00 ~2001.1.1 9:00:00 | 100 | 0002 | |
| .. | .. | .. | .. | .. |

1402  1403  1404  1405  1406

FIG.15
PID 100
Module 0001
Resource CM.BML
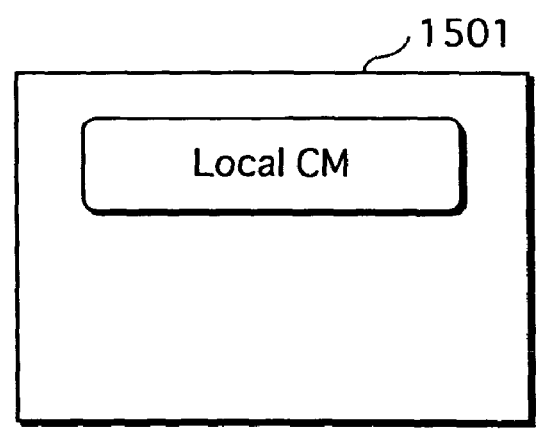
PID 100
Module 0002
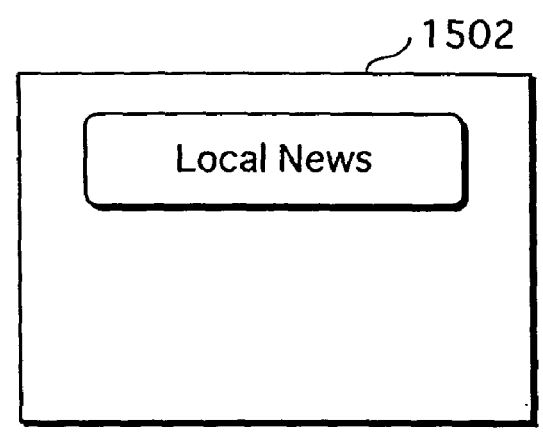

FIG.20

2001 Selection List

| Data Broadcast Program Name | Shopping Information | PID | Module Name/EMID | Selection Flag |
|---|---|---|---|---|
| Shopping Information | 2002.1.1 7:00:00 ~2002.1.1 8:00:00 | 100 | 0001 | 1 |
| | 2002.1.1 7:00:00 ~2002.1.1 8:00:00 | 101 | 0000 | 1 |
| | 2002.1.1 7:00:00 ~2002.1.1 8:00:00 | 102 | 0000 | 1 |
| | 2002.1.1 7:00:00 ~2002.1.1 8:00:00 | 102 | 0001 | 0 |
| | 2002.1.1 7:00:00 ~2002.1.1 8:00:00 | 103 | 0000 | 1 |
| | 2002.1.1 7:00:00 ~2002.1.1 8:00:00 | 103 | 0001 | 1 |
| | 2002.1.1 7:00:00 ~2002.1.1 8:00:00 | 103 | 0002 | 0 |

2101 Replacement List

| Data Broadcast Program Name | Broadcast Period | PID | Module Name | Resource Name (Pre-replacement) | Resource Name (Post-replacement) |
|---|---|---|---|---|---|
| Shopping Information | 2002.1.1 7:00:00 ~2002.1.1 8:00:00 | 102 | 0000 | | |

2102

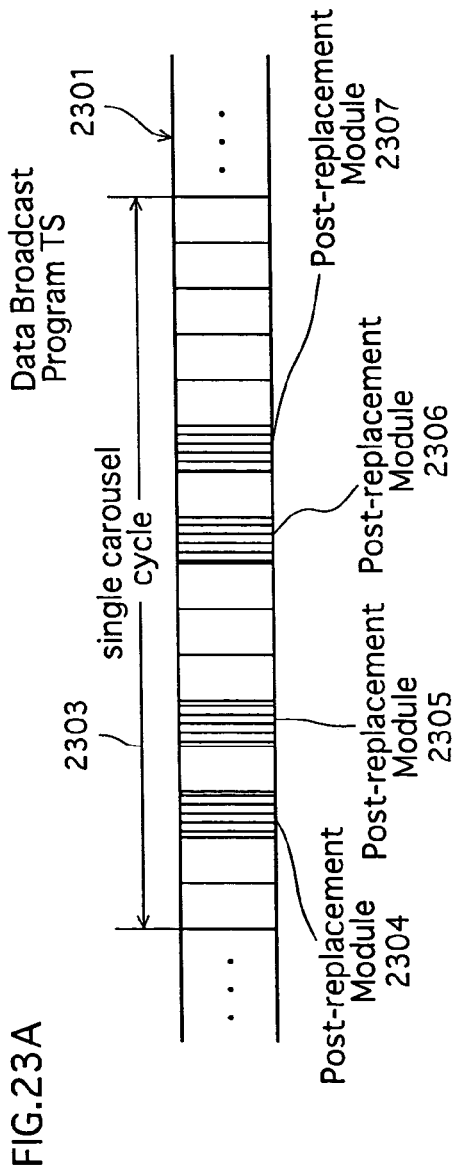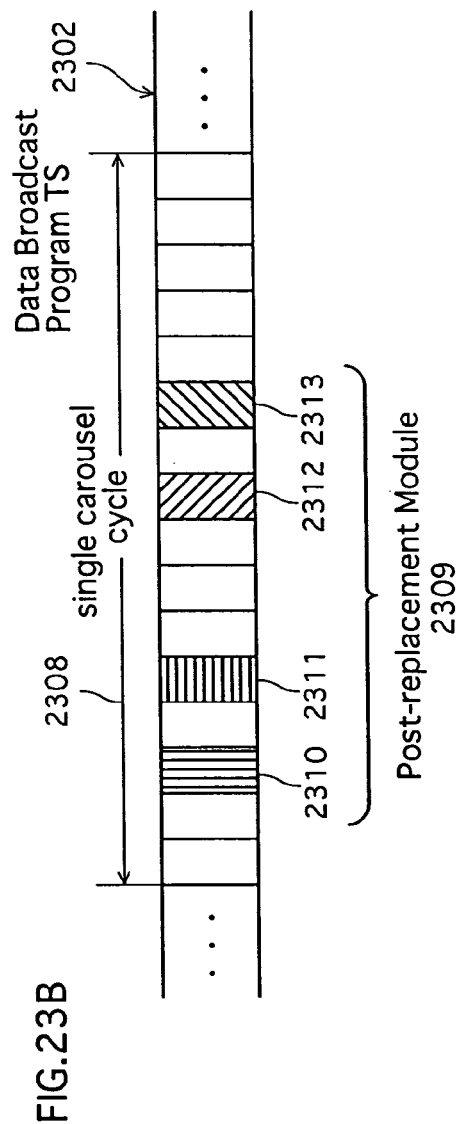
FIG.23A
FIG.23B

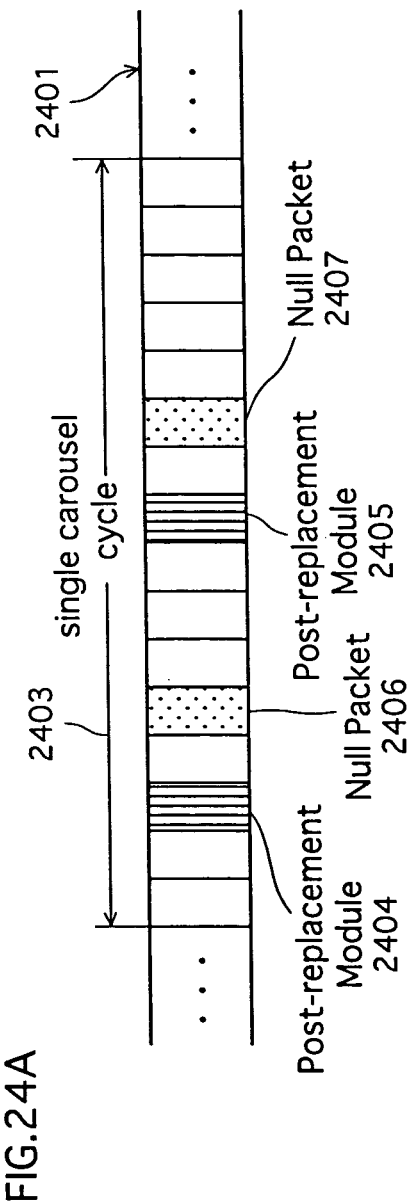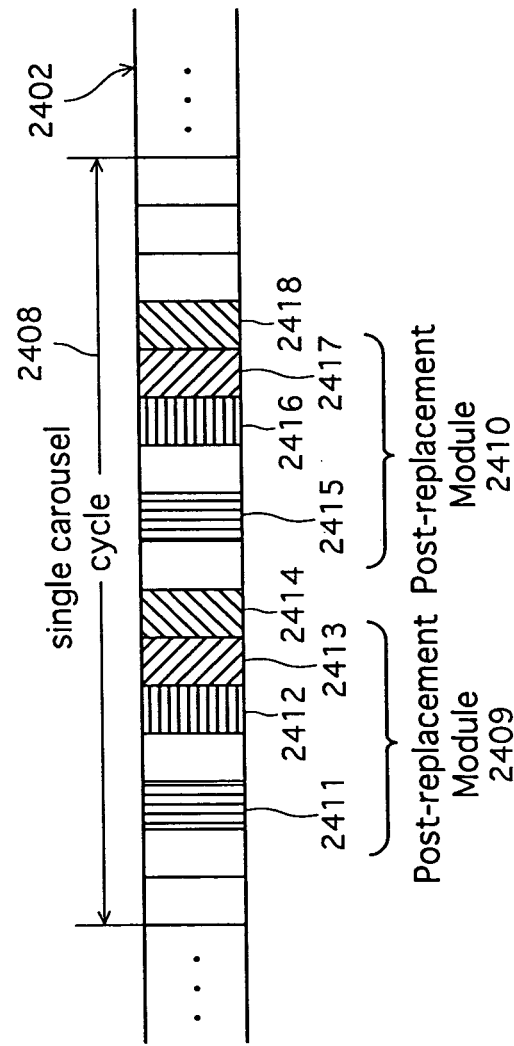
FIG.24A
FIG.24B

FIG.25
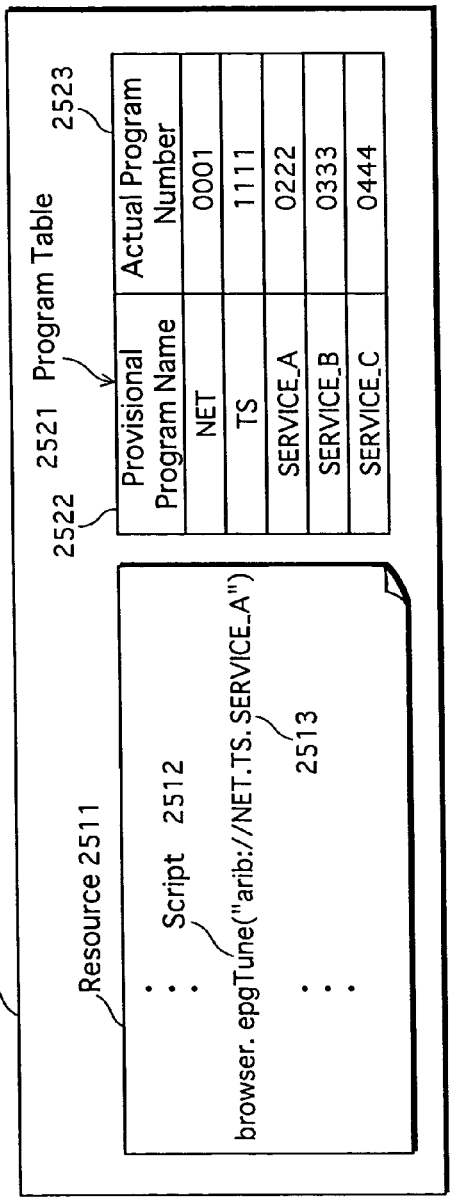
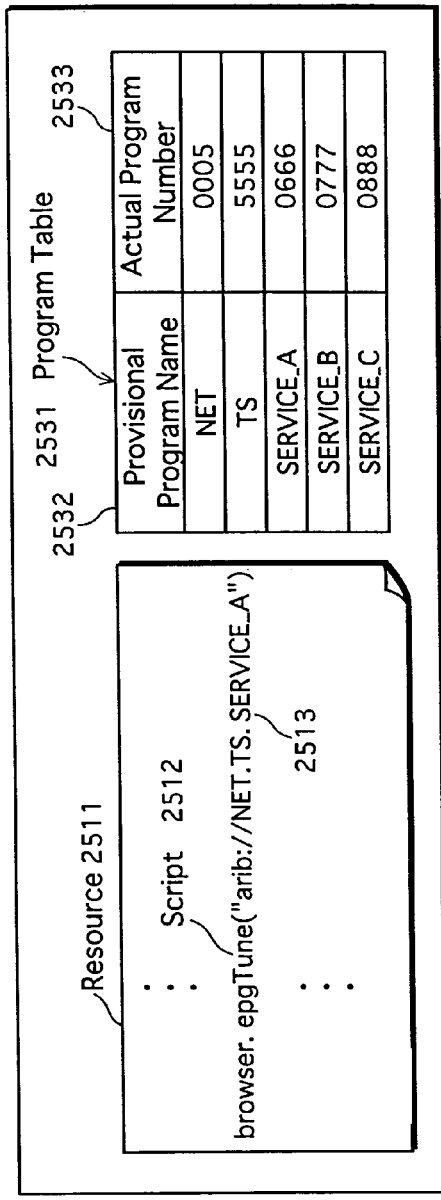

DATA BROADCAST PROGRAM TRANSPORT STREAM (TS) TRANSMISSION DEVICE, RELATED METHOD, COMPUTER PROGRAM AND STORAGE MEDIUM, DISTRIBUTION DEVICE AND DISTRIBUTION SYSTEM

TECHNICAL FIELD

The present invention relates to a data broadcast program transport stream (TS) transmission device and a distribution device that are used in digital broadcasting to transmit data broadcast program transport streams having data broadcast program contents multiplexed thereon.

BACKGROUND ART

Following developments in digital broadcasting, data broadcast program contents are being produced in large quantities and multiplexed with broadcast programs to provide data broadcast program transport streams for broadcasting by broadcast stations.

Current forms of ground wave television broadcasting use a net distribution system, according to which broadcast programs produced by a key station are distributed to local stations, which then broadcast the broadcast programs as distributed (i.e. in an unaltered state). Likewise, in satellite broadcasting, a CATV station receives satellite broadcasts, and then retransmits the received satellite broadcasts to household CATV receiving devices.

However, in the case of data broadcast programs, a system of distributing data broadcast programs to a plurality of broadcast stations, as is possible with the net distribution used in ground wave television broadcasting, is not yet available.

DISCLOSURE OF THE INVENTION

An object of the present invention is to provide a data broadcast program TS transmission device, a related method, a distribution device, and a distribution system that allow for the transmission of a data broadcast program TS based on a received data broadcast program TS.

This object can be achieved by a data broadcast program TS transmission device provided in a broadcast station, and for (i) receiving a first transport stream having multiplexed thereon a first content that includes one or more source elements and (ii) transmitting a data broadcast program transport stream based on the received first TS, the data broadcast program TS transmission device including: a judgment list storage unit operable to store a judgment list that shows for each source element, whether the source element is for inclusion in a data broadcast program content of the broadcast station; a separation judgment unit operable to separate each source element from the first TS, and to judge in accordance with the judgment list whether the separated source element is for inclusion in the data broadcast program content; and an output unit operable to output the data broadcast program TS with the separated source element included in the data broadcast program content if the separation judgment unit judges in the affirmative.

According to this structure, the data broadcast program TS (i.e. "transport stream") to be broadcast by the broadcast station is generated using required structural elements (i.e. "source elements") of the received first TS. As a result, production costs can be reduced because the broadcast station does not have to produce all of the structural elements of the data broadcast program content.

Here, the judgment list storage unit may have a selection list storage subunit operable to store a selection list in which identifiers identifying the source elements are paired with determinators showing whether the source elements are for inclusion in the data broadcast program content, and the separation judgment unit may have a separation subunit operable to separate each source element from the first TS; a judgment subunit operable to judge whether an identifier of the separated source element matches an identifier paired in the selection list with a determinator showing the source element to be for inclusion; and a notification subunit operable to notify the output unit of the separated source element if the judgment subunit judges in the affirmative.

According to this structure, the data broadcast program content can be produced to include only required structural elements of the received first TS by referring to a selection list that shows for each structural element of the first content, whether the structural element is to be included in the data broadcast program content of the broadcast station.

Here, the data broadcast program TS transmission device may further include a local element storage unit operable to store one or more local elements produced in the broadcast station. Also, the judgment list storage unit may further have a replacement list storage subunit operable to store a replacement list that shows the replacement of source elements judged to be for inclusion by the separation judgment unit with local elements stored in the local element storage unit, the separation judgment unit may further have a replacement judgment subunit operable to, if the judgment subunit judges in the affirmative, refer to the replacement list and judge whether the separated source element is for replacement, the notification subunit may send a replacement instruction to the output unit if the replacement judgment subunit judges in the affirmative, and the output unit may have a reading subunit operable to, if a replacement instruction is received from the notification subunit, read a local element indicated in the replacement instruction from the local element storage unit; and a generation output subunit operable to generate the data broadcast program TS based on local elements read by the reading subunit and source elements notified by the notification subunit, and for outputting the generated data broadcast program TS.

According to this structure, the data broadcast program TS is generated by replacing structural elements of the first content with structural elements produced locally in the broadcast station (i.e. "local elements"). As a result, a data broadcast program that is unique to the broadcast station can be easily produced.

Here, the one or more local elements may be modules, which are stored together with corresponding identifiers in the local element storage unit, and the replacement list may show the identifiers of source elements for replacement and the identifiers of local elements that are to replace the source elements.

Here, the one or more local elements may be resources, which are stored together with corresponding identifiers in the local element storage unit, and the replacement list may show the identifiers of source elements for replacement and the identifiers of local elements that are to replace the source elements.

Here, the one or more local elements may be event messages, which are stored together with corresponding identifiers in the local element storage unit, and the replacement list may show the identifiers of source elements for replacement and the identifiers of local elements that are to replace the source elements.

According to these structures, a data broadcast program that is unique to the broadcast station can be produced by replacing a module, a resource, or an event message structuring the first content with a module, a resource, or an event message produced in the broadcast station.

Here, the source elements may include a data broadcast program, a commercial message to be inserted into the data broadcast program, and an event message that controls a timing of the CM processing, and if the CM is not shown for replacement in the replacement list and if the identifier of the CM is paired in the selection list with a determinator showing the CM to be not for inclusion in the data broadcast program content, then the identifier of the EM may also be paired in the selection list with a determinator showing the EM to be not for inclusion in the data broadcast program content.

According to this structure, when a CM (i.e. commercial message) and a corresponding EM (i.e. event message) are included in the received first content, and the CM is not for inclusion as a structural element in the data broadcast program content, it is possible to also not include the EM in the data broadcast program content.

Here, the output unit may have a first setting subunit operable to set the data broadcast program TS to maintain the same bandwidth as the first TS; a repeat multiplexing subunit operable to, if a TS packet surplus in a carousel cycle of the data broadcast program TS arises because a local element is smaller in size than a source element shown in the replacement list for replacement, repeatedly multiplex a TS packet generated from the local element onto the data broadcast program TS to eliminate the surplus; and a cycle-delay packet multiplexing subunit operable to, if a TS packet shortage in a carousel cycle of the data broadcast program TS arises because a local element is larger in size than a source element shown in the replacement list for replacement, multiplex any surplus TS packets generated from the local element onto the data broadcast program TS in a subsequent carousel cycle.

According to this structure, it is possible to prevent any increase in the bandwidth allotted to a data broadcast program TS that has been set in advance.

Here, the output unit may have a second setting subunit operable to set the data broadcast program TS to maintain an equal number of elements transmitted per carousel cycle as the first TS; a null packet multiplexing subunit operable to, if a TS packet surplus in a carousel cycle of the data broadcast program TS arises because a local element is smaller in size than a source element shown in the replacement list for replacement, multiplex any surplus TS packets onto the data broadcast program TS as null packets; and an insert-packet multiplexing subunit operable to, if a TS packet shortage in a carousel cycle of the data broadcast program TS arises because a local element is larger in size than a source element shown in the replacement list for replacement, forcibly insert a TS packet generated from the local element onto the data broadcast program TS in the carousel cycle.

According to this structure, the response time required to display a structural element by a viewer remote control operation in a receiving device that receives the data broadcast program TS can be set to be the same as the distributed first TS.

Here, if the source element notified by the notification subunit includes a script for controlling a station selection operation, the script may use a provisional identifier to show a station selection target, and another source element may be an identifier table that shows a correspondence between the provisional identifier and the station selection target. Furthermore, the identifier table may be shown in the replacement list, and an identifier table produced in the broadcast station may be stored in the local element storage unit.

According to this structure, if a script for controlling a station selection operation is included as a structural element, then an identifier table that indirectly shows a selection target is included as another structural element, and by replacing this identifier table with an identifier table stored in the structural element storage unit, it is no longer required to replace the script.

Here, the generation output subunit may discard the source elements notified by the notification subunit that are judged by the replacement judgment subunit for replacement.

According to this structure, it is possible to omit structural elements of the first content that are no longer required.

Here, the data broadcast program TS transmission device may further include a local element storage unit operable to store one or more local elements produced in the broadcast station, as well as identifiers identifying the local elements, and the judgment list storage unit may further have a supplementary list storage subunit operable to store a supplementary list showing the identifiers of local elements for supplementing to the data broadcast program content. Furthermore, if an identifier of a local element is shown in the supplementary list, the notification subunit may notify the output unit of the identifier and send a supplement instruction to the output unit, and the output unit may have a reading subunit operable to, if a supplement instruction is received from the notification subunit, read from the local element storage unit a local element identified by the identifier notified by the notification subunit; and a generation output subunit operable to generate the data broadcast program TS based on local elements read by the reading subunit and source elements notified by the notification subunit, and for outputting the generated data broadcast program TS.

According to this structure, the data broadcast program content of the broadcast station can be further improved by supplementing the structural elements of the first content with unique structural elements produced in the broadcast station.

Here, at least one of a module, a resource, and an event message may be produced in the broadcast station as local elements.

According to this structure, a module, a resource, or an event message produced as structural elements in the broadcast station can be supplemented to the structural elements of the first content.

Here, the source elements may be structured from TS packets, the identifiers of the source elements may be packet identifiers, and the determinators may all show the source elements to be for inclusion.

According to this structure, the data broadcast program TS uses the received first TS in an unaltered state, and as a result a unique data broadcast program does not need to be produced in the broadcast station.

Here, the output unit may receive input of a second transport stream having multiplexed thereon a second content produced in the broadcast station, and may output the data broadcast program TS with the second TS and the source elements notified by the notification subunit multiplexed thereon.

According to this structure, the data broadcast program is generated from a second data broadcast program that was produced in the broadcast station and structural elements of the distributed first content.

The above object may also be achieved by a data broadcast program data stream transmission device provided in a broadcast station, and for (i) receiving a first data stream having a first content that includes one or more source elements and (ii)

transmitting a data broadcast program data stream based on the received first data stream, the data broadcast program data stream transmission device including: a judgment list storage unit operable to store a judgment list that shows for each source element, whether the source element is for inclusion in a data broadcast program content of the broadcast station; a separation judgment unit operable to separate each source element from the first data stream, and to judge in accordance with the judgment list whether the separated source element is for inclusion in the data broadcast program content; and an output unit operable to output the data broadcast program data stream with the separated source element included in the data broadcast program content if the separation judgment unit judges in the affirmative.

According to this structure, the data broadcast program data stream to be broadcast by the broadcast station is generated using required structural elements of the received first data stream. As a result, the production of the data broadcast program is made easier, and production costs can be reduced.

The above object may also be achieved by a method for transmitting a data broadcast program transport stream based on a received first transport stream that has multiplexed thereon a first content having one or more source elements, the method including: a judgment list storage step of storing a judgment list that shows for each source element, whether the source element is for inclusion in a data broadcast program content of the broadcast station; a separation judgment step of separating each source element from the first TS, and judging in accordance with the judgment list whether the separated source element is for inclusion in the data broadcast program content; and an output step of outputting the data broadcast program TS with the separated source element included in the data broadcast program content if judged in the affirmative in the separation judgment step.

According to this structure, the data broadcast program TS to be broadcast by the broadcast station is generated using required structural elements of the received first TS. As a result, the production of the data broadcast program is made easier, and production costs can be reduced.

The above object may also be achieved by a computer program that has a computer execute a method for transmitting a data broadcast program transport stream based on a received first transport stream that has multiplexed thereon a first content having one or more source elements, the computer program including: a judgment list storage step of storing a judgment list that shows for each source element, whether the source element is for inclusion in a data broadcast program content of the broadcast station; a separation judgment step of separating each source element from the first TS, and judging in accordance with the judgment list whether the separated source element is for inclusion in the data broadcast program content; and an output step of outputting the data broadcast program TS with the separated source element included in the data broadcast program content if judged in the affirmative in the separation judgment step.

The above object may also be achieved by a computer-readable storage medium storing a computer program that has a computer execute a method for transmitting a data broadcast program transport stream based on a received first transport stream that has multiplexed thereon a first content having one or more source elements, the computer program including: a judgment list storage step of storing a judgment list that shows for each source element, whether the source element is for inclusion in a data broadcast program content of the broadcast station; a separation judgment step of separating each source element from the first TS, and judging in accordance with the judgment list whether the separated source element is for inclusion in the data broadcast program content; and an output step of outputting the data broadcast program TS with the separated source content included in the data broadcast program content if judged in the affirmative in the separation judgment step.

The above object may also be achieved by a distribution device for distributing a first content that includes one or more source elements to a data broadcast program transport stream transmission device for transmitting a data broadcast program transport stream based on the first content, the distribution device including: a circulation unit operable to circulate to the data broadcast program TS transmission device prior to distributing the first content, content information that shows (i) a broadcast period of the first content, and (ii) identification information; and a distribution unit operable to distribute a first transport stream in which the first content includes at least one source element that is for inclusion by the data broadcast program TS transmission device in a data broadcast program content.

In a data broadcast program TS transmission device that receives a first TS distributed by a distribution device according to the above structure, structural elements are produced in advance together with a selection list, a replacement list and a supplementary list based on content information, and then when the first TS is received, the data broadcast program TS transmission device is able to transmit a data broadcast program TS based on the received first TS.

Here, if the source element notified by the notification subunit includes a script for controlling a station selection operation, the script may use a provisional identifier to show a station selection target, and another source element may be an identifier table that shows a correspondence between the provisional identifier and the station selection target.

According to this structure, a data broadcast program TS can be readily transmitted in a broadcast station targeted for distribution by replacing only the identifier table and not the script.

Here, the content information may include validity information that shows for each source element of the first content, whether the source element is for inclusion in the data broadcast program content.

According to this structure, it can be easily judged in a broadcast station targeted for distribution whether or not a structural element should be used.

The above object may also be achieved by a distribution system formed from (i) a distribution device that distributes a first content, and (ii) a data broadcast program transport stream transmission device that is provided in a broadcast station and that transmits a data broadcast program transport stream. The distribution device includes a circulation unit operable to circulate to the data broadcast program TS transmission device prior to distributing the first content, content information that shows (i) a broadcast period of the first content, and (ii) identification information; and a distribution unit operable to distribute a first transport stream in which the first content includes at least one source element that is for inclusion by the data broadcast program TS transmission device in a data broadcast program content. Furthermore, the data broadcast program TS transmission device includes a judgment list storage unit operable to store a judgment list that shows for each source element, whether the source element is for inclusion in a data broadcast program content of the broadcast station; a separation judgment unit operable to separate each source element from the first TS, and to judge in accordance with the judgment list whether the separated source element is for inclusion in the data broadcast program content; and an output unit operable to output the data broadcast program TS with the separated source element included in the data broadcast program content if the separation judgment unit judges in the affirmative.

According to this structure, a distribution device distributes to a data broadcast program TS transmission device provided in a broadcast station, a first TS to be broadcast by another broadcast station, and as a result costs involved in the broadcast station producing and transmitting a data broadcast program TS can be reduced.

BRIEF DESCRIPTION OF THE DRAWINGS

FIG. 2 shows an exemplary net distribution list that lists distribution targets to which another broadcast station of embodiment 1 is to distribute a data broadcast program TS;

FIG. 3 shows exemplary data broadcast program content information relating to a content of the data broadcast program TS to be distributed by the other broadcast station of embodiment 1;

FIG. 4 shows an exemplary selection list stored in a judgment list storage unit of embodiment 1;

FIG. 7 shows a further exemplary selection list stored in the judgment list storage unit of embodiment 1

FIG. 10 shows an exemplary replacement list stored in a judgment list storage unit 102 of embodiment 2;

FIG. 11 shows an exemplary content stored in a program element storage unit 901 of embodiment 2;

FIG. 14 shows an exemplary supplementary list stored in a judgment list storage unit provided in an embodiment 3 of the data broadcast program TS transmission device according to the present invention;

FIG. 15 shows exemplary data broadcast program elements stored in a program element storage unit of embodiment 3;

FIG. 20 shows an exemplary selection list stored in a judgment list storage unit of embodiment 5;

FIG. 21 shows an exemplary replacement list stored in the judgment list storage unit of embodiment 5;

FIGS. 23A and 23B each show an exemplary TS to be outputted from the data broadcast program TS transmission device of embodiment 6 when a bandwidth has been maintained post-replacement;

FIGS. 24A and 24B each show an exemplary TS to be outputted from the data broadcast program TS transmission device of embodiment 6 when the number of structural elements transmitted per carousel cycle has been maintained post-replacement;

FIG. 25 shows an exemplary content of data broadcast program elements according to an embodiment 7 of the data broadcast program TS transmission device according to the present invention.

BEST MODE FOR CARRYING OUT THE INVENTION

Embodiments of a data broadcast program transport stream (TS) transmission device according to the present invention will now be described with reference to the drawings.

Here, the embodiments described below comply with standards laid out in ARIB (Association of Radio Industries and Businesses) STD-B24 ver. 1.0, *Data Coding and Transmission Specifications for Digital Broadcasting*, vol. 2, ch. 9.1.1~9.1.2 "Transmission of Content", and vol. 3, ch. 6 "Data Carousel Transmission Specifications".

Embodiment 1

Figure 1:
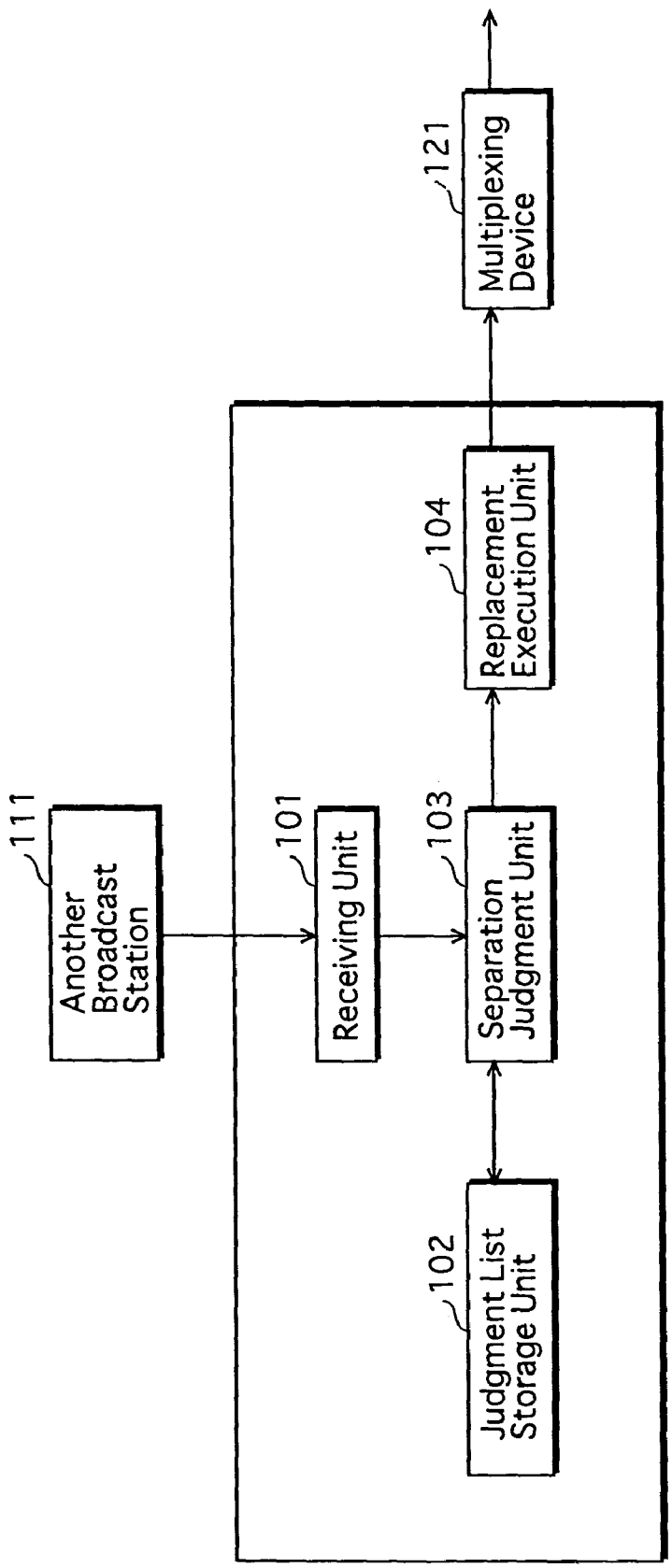
FIG. 1 is a structural diagram showing an embodiment 1 of a data broadcast program TS transmission device according to the present invention.

FIG. 1 is a structural diagram showing an embodiment 1 of a data broadcast program TS transmission device that is provided in a broadcast station.

The data broadcast program TS transmission device of embodiment 1 includes a receiving unit 101, a judgment list storage unit 102, a separation judgment unit 103, and a replacement execution unit 104.

Receiving unit 101 receives a data broadcast program TS that has been net distributed by another broadcast station 111, and notifies separation judgment unit 103 of the received data broadcast program TS.

Broadcast station 111 distributes the data broadcast program TS to broadcast stations targeted for distribution (hereafter "distribution targets") in accordance with a net distribution list as shown in FIG. 2. Net distribution list 201 in FIG. 2 includes a data broadcast program name column 202, a PID (packet identifier) column 203, and a distribution target column 204. The distribution targets in net distribution list 201 are specified in PID units.

Here, "data broadcast program" refers to independent information programs such as news, weather, and traffic information, for example, which are used to supplement broadcast programs. A data broadcast program can be selected for viewing at any time within a given broadcast period.

FIG. 3 shows exemplary data broadcast program content information relating to a content of the data broadcast program TS to be distributed by broadcast station 111 to a second broadcast station shown in FIG. 2.

Data broadcast program content information 301 includes a data broadcast program name column 302, a PID column 303, a module name column 304, a resource name column 305, and a broadcast period column 306.

A data broadcast program content is structured from elements known as modules, and modules are in turn structured from element known as resources. When a data broadcast program content is to be transmitted as a data broadcast program TS according to MPEG-2 (Moving Picture Expert Group 2), units known as transport stream packets (hereafter "TS packets") are used to carry the data broadcast program content. Each TS packet has attached a PID (packet ID) that identifies the packet. Moreover, the TS packets have a fixed data length, which means that a single module may be contained within a plurality of packets, or alternatively, a plurality of modules may have attached the same PID.

A data broadcast program element is generally a single module or a single resource, although a data broadcast program element may sometimes refer to a plurality of modules having attached the same PID.

PID column 303 shows the PIDs attached to TS packets that contain the data broadcast program content to be transmitted as the data broadcast program TS.

Module name column 304 shows the names identifying modules.

Resource name column 305 shows the names identifying resources.

Broadcast period column 306 shows the broadcast time period of the data broadcast program. The data broadcast program TS is broadcast within this time period.

Prior to distributing the data broadcast program TS to the second broadcast station in which the data broadcast program TS transmission device of embodiment 1 is provided, broadcast station 111 notifies the second broadcast station in advance of data broadcast program content information 301.

A data broadcast program producer in the second broadcast station refers to the notified information 301, determines whether any of the data broadcast program elements (i.e. "source elements") contained within the data broadcast program TS to be distributed by broadcast station 111 are for inclusion as elements in a data broadcast program to be produced by the second broadcast station, and generates a selection list.

Here, all other data broadcast programs except for the data broadcast program "weather information" have been omitted from data broadcast program content information 301. However, information 301 may collectively show, for example, data broadcast programs to be broadcast during a single day. Moreover, separate data broadcast program content information may be generated for each data broadcast program.

Judgment list storage unit 102 stores the selection list shown in FIG. 4.

Selection list 401 includes a data broadcast program name column 402, a broadcast period column 403, a PID column 404, and a selection flag column 405.

Data broadcast program name column 402 shows the names of data broadcast programs, and broadcast period column 403 shows the time period during which the data broadcast program elements will be transmitted. PID column 404 shows the PIDs of packets that contain data broadcast program elements. Selection flag column 405 shows a "1" when a data broadcast program element identified by a PID is selected (i.e. element for inclusion in the data broadcast program of the second broadcast station), and a "0" when the element identified by a PID is not selected (i.e. element not for inclusion in the data broadcast program of the second broadcast station).

Here, the data broadcast program elements are shown in PID units, although data broadcast program elements may be shown in module units or resource units.

Furthermore, all data broadcast programs except for the data broadcast program "weather information" have been omitted from selection list 401. However, list 401 may collectively show, for example, data broadcast programs to be broadcast during a single day. Moreover, a separate selection list may be generated for each data broadcast program.

Separation judgment unit 103 separates each TS packet from the data broadcast program TS notified by receiving unit 101. If (i) the present time is within the broadcast period shown in broadcast period column 403 of selection list 401, (ii) the PID of the separated TS packet matches a PID shown in PID column 404 of selection list 401, and (iii) selection flag column 405 of selection list 401 shows "1", unit 103 notifies replacement execution unit 104 of the separated TS packet. However, if selection flag column 405 shows "0", unit 103 discards the separated TS packet.

Replacement execution unit 104 outputs the TS packet notified by separation judgment unit 103 to a multiplexing device 121 as the data broadcast program TS of the second broadcast station.

Here, in embodiment 1, all of the TS packets included in the data broadcast program TS distributed by broadcast station 111 are selected, and thus the distributed data broadcast program TS is outputted to multiplexing device 121 in an unaltered state.

Furthermore, replacement execution unit 104 may rewrite the PID attached to a notified TS packet before outputting the TS packet to multiplexing device 121 as the data broadcast program TS of the second broadcast station.

In multiplexing device 121 provided in the second broadcast station, the data broadcast program TS outputted by replacement execution unit 104 is multiplexed onto a broadcast program TS containing image and audio data, and the resultant transport stream is then transmitted to a receiving device (not depicted).

Figure 5:
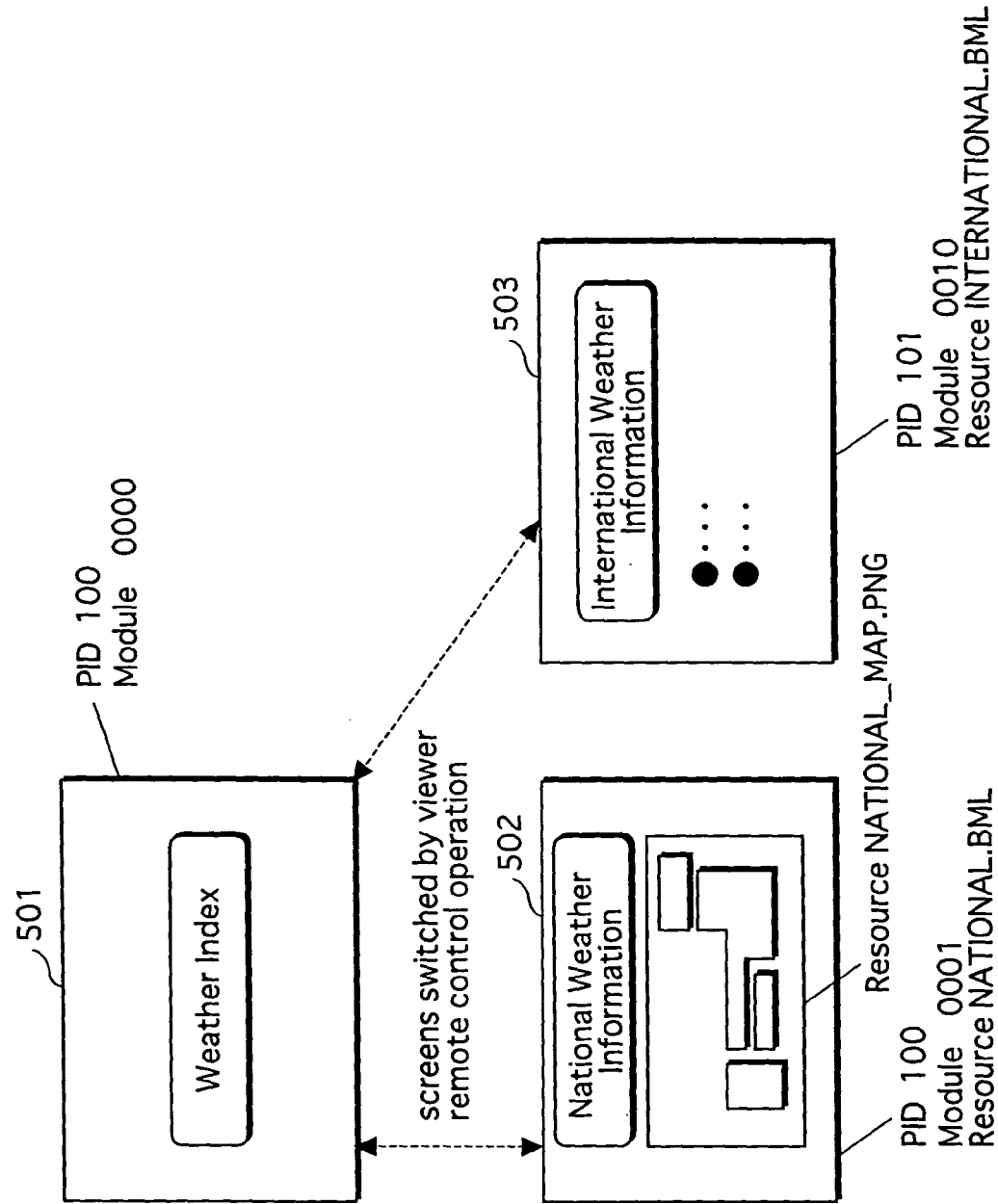
FIG. 5 shows exemplary screens of a receiving device that has received the data broadcast program TS according to embodiment 1.

The receiving device is able to receive a data broadcast program as shown in FIG. 5. The data broadcast program "weather information" is formed from screens 501, 502, and 503. Screen 501 is structured by a PID "100", a module "0000", and a resource name "INDEX.BML". Screen 502 is structured by PID "100", a module "0001", and a resource name "NATIONAL.BML". Screen 503 is structured by a PID "101", a module "0010", and a resource name "INTERNATIONAL.BML".

Screens 501, 502, and 503 can be switched by a viewer remote control operation.

Figure 6:
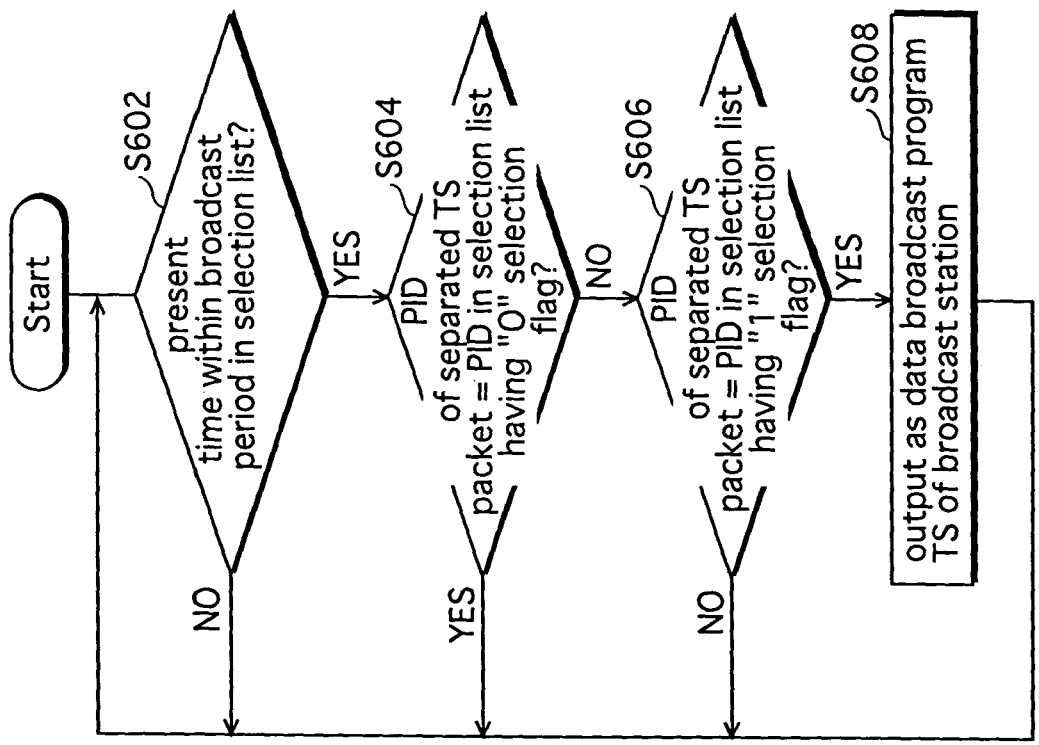
FIG. 6 is a flowchart of a processing operation according to embodiment 1.

The processing in embodiment 1 will now be described with reference to the flowchart in FIG. 6.

When notified of a data broadcast program TS by receiving unit 101, separation judgment unit 103 judges whether the present time is within a broadcast period shown in broadcast period column 403 of selection list 401 stored in judgment list storage unit 102 (step S602). If judged in the negative (i.e. step S602="NO"), the processing returns to step S602. If judged in the affirmative (i.e. step S602="YES"), unit 103 judges whether the PID of the TS packet separated from the notified data broadcast program TS matches a PID in PID column 404 that corresponds to a "0" selection flag in selection flag column 405 (step S604).

If judged in the affirmative (i.e. step S604="YES"), the processing returns to step S602. If judged in the negative (i.e. step S604="NO"), unit 103 judges whether the PID of the separated TS packet matches a PID in PID column 404 that corresponds to a "1" selection flag in selection flag column 405 (step S606). If judged in the negative (i.e. step S606="NO"), the processing returns to step S602. If judged in the affirmative (i.e. step S606="YES") unit 103 notifies replacement execution unit 104 of the separated TS packet.

When notified of the separated TS packet by separation judgment unit 103, replacement execution unit 104 outputs the notified TS packet to multiplexing device 121 as the data broadcast program TS of the second broadcast station (step S608), and the processing returns to step S602. Thus completes the description of the processing.

The following description of embodiment 1 is based on a selection list as in FIG. 7 being stored in judgment list storage unit 102.

In selection list 701, the selection of the TS packet identified by PID "100" from the data broadcast program TS of the net distributed data broadcast program "weather information" is shown by the "1" selection flag, and the non-selection of the TS packet identified by PID "101" is shown by the "0" selection flag.

As such, separation judgment unit 103 refers to selection list 701, notifies replacement execution unit 104 of the TS packet identified by PID "100", and discards the TS packet identified by PID "101".

Next, replacement execution unit 104 outputs the TS packet identified by PID "100" to multiplexing device 121 as the data broadcast program TS of the data broadcast program "weather information" of the second broadcast station.

Figure 8:
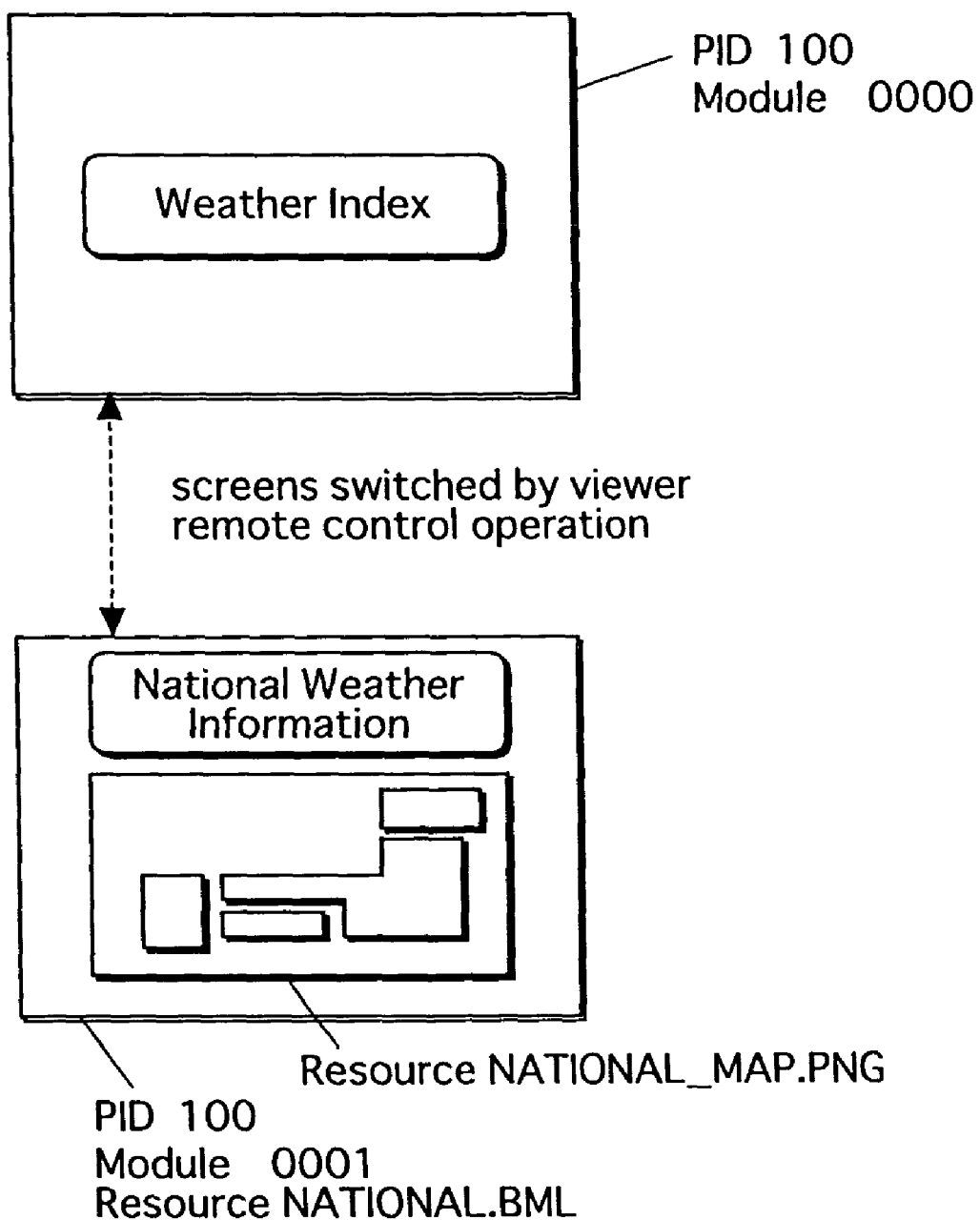
FIG. 8 shows exemplary screens of a receiving device that has received a data broadcast program TS broadcast in accordance with the selection list in FIG. 7.

As a result, screens of the data broadcast program as shown in FIG. 8 can be viewed in a receiving device that receives the data broadcast program TS broadcast by multiplexing device 121. Screens 801 and 802 are the same as screens 501 and 502, respectively, in FIG. 5. Since the TS packet identified by PID "101" was not selected in the given example, screen 503 in FIG. 5 cannot be viewed as part of the received data broadcast program.

Here, in the data broadcast program TS transmission device of embodiment 1, selection lists are generated by referring to data broadcast program content information 301. However, it is possible to prepare usage validity information that shows for each structural element in data broadcast program content information 301, whether the structural element is for inclusion in the data broadcast program content of the second broadcast station. In this way, selection lists can be readily generated in the data broadcast program TS transmission device of embodiment 1 by referring to the usage validity information.

Embodiment 2

Figure 9:
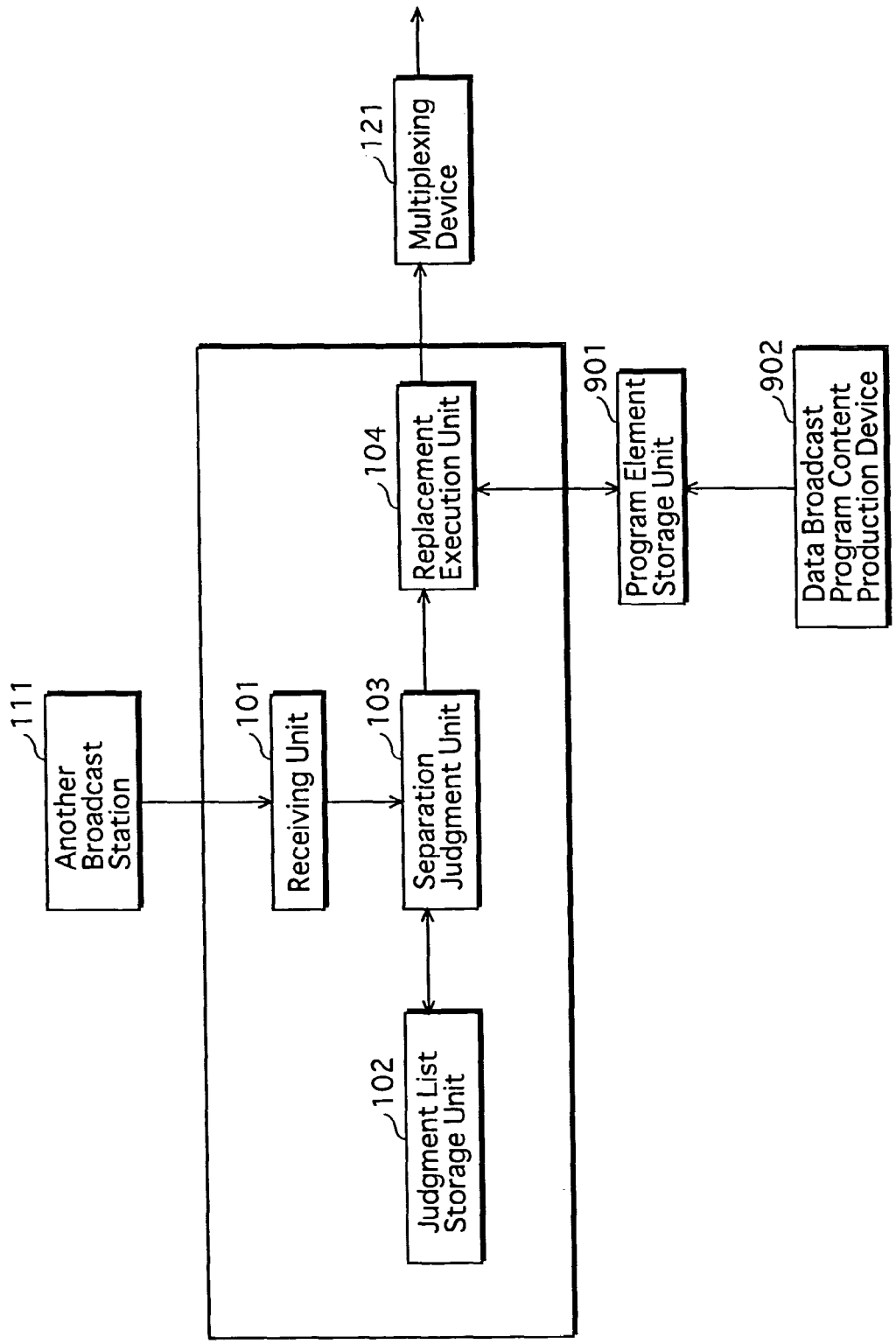
FIG. 9 is a structural diagram showing an embodiment 2 of the data broadcast program TS transmission device according to the present invention.

FIG. 9 is a structural diagram showing an embodiment 2 of the data broadcast program TS transmission device according to the present invention.

The data broadcast program TS transmission device of embodiment 2 includes receiving unit 101, judgment list storage unit 102, separation judgment unit 103, replacement execution unit 104, and a program element storage unit 901. Structural components in embodiment 2 that correspond to structural components in embodiment 1 are shown using the same numbering, and a description of these structural components is omitted here.

Here, as in embodiment 1, receiving unit 101 receives the data broadcast program TS shown in data broadcast program content information 301; that is, the data broadcast program TS which has been net distributed by another broadcast station 111.

Judgment list storage unit 102 stores both selection list 401 shown in FIG. 4 and a replacement list 1001 shown in FIG. 10.

Replacement list 1001 includes a data broadcast program name column 1002, a broadcast period column 1003, a PID column 1004, a module name column 1005, a pre-replacement resource name column 1006, and a post-replacement resource name column 1007.

Data broadcast program name column 1002 shows data broadcast program names, broadcast period column 1003 shows the broadcast period of data broadcast programs in column 1002, PID column 1004 shows the PIDs of TS packets included in distributed data broadcast program transport streams.

Module name column 1005 shows the names of modules that are to be replaced. That is, column 1005 shows the replacement of modules distributed as data broadcast program elements (i.e. "source elements") by another broadcast station with modules produced as data broadcast program elements (i.e. "local elements") in a broadcast station in which the data broadcast program TS transmission device of embodiment 2 is provided. In the event of an entire module being replaced, pre-replacement resource name column 1006 and post-replacement resource name column 1007 corresponding to the module name shown in module name column 1005 remain blank.

Pre-replacement resource name column 1006 shows the names of resources distributed as data broadcast program elements, and post-replacement resource name column 1007 shows the name of resources produced as data broadcast program elements in the broadcast station in which the data broadcast program TS transmission device of embodiment 2 is provided. That is, columns 1006 and 1007 show the replacement of resources distributed as data broadcast program elements with resources produced as data broadcast program elements in the broadcast station in which the data broadcast program TS transmission device of embodiment 2 is provided.

Program element storage unit 901 stores modules and resources produced as data broadcast program elements by a data broadcast program content production device 902 of the broadcast station in which the data broadcast program TS transmission device of embodiment 2 is provided.

FIG. 11 shows a data broadcast program element 1101 identified by a PID "101" and a module name "0010", a data broadcast program element 1102 identified by a PID "100", a module name "0001" and a resource name "LOCAL.BML", and a data broadcast program element 1103 identified by PID "100", module name "0001" and a resource name "LOCAL_MAP.PNG".

When notified via receiving unit 101 of a data broadcast program TS that has been net distributed by broadcast station 111, separation judgment unit 103 separates a TS packet from the distributed data broadcast program TS. Unit 103 then refers to selection list 401 stored in judgment list storage unit 102, judges whether the present time is within the broadcast period shown in broadcast period 403, and if "YES", unit 103 judges whether the PID of the separated TS packet matches a PID in PID column 404 corresponding to a "1" selection flag in selection flag column 405. If "YES", unit 103 refers to replacement list 1001 stored in judgment list storage unit 102, and judges whether a PID matching the PID of the separated TS packet is shown in PID column 1004. If "NO", unit 103 notifies replacement execution unit 104 of the separated TS packet, and if "YES", unit 103 judges whether the module name of the separated TS packet matches a module name in module name column 1005 of replacement list 1001, and if "YES", unit 103 judges whether the post-replacement resource name column 1007 and pre-replacement resource name column 1006 are blank. If "YES", unit 103 notifies replacement execution unit 104 of the matching module name and the corresponding PID, and sends a replacement instruction to unit 104.

If the resource name of the separated packet matches a resource name shown in pre-replacement resource name column 1006 of replacement list 1001, separation judgment unit 103 notifies replacement execution unit 104 of the PID, module name, and resource name in post-replacement resource name column 1007 corresponding to the matching resource name, and sends a replacement instruction to unit 104.

If a PID and a module name are notified by separation judgment unit 103 together with the replacement instruction, replacement execution unit 104 reads the module identified by the notified module name from program element storage unit 901, and generates a TS packet. On the other hand, if a PID, a module name, and a resource name are notified by separation judgment unit 103 together with the replacement instruction, replacement execution unit 104 reads the resource identified by the notified resource name from program element storage unit 901, and generates a TS packet. The pre-replacement TS packet to which the replacement instruction from separation judgment unit 103 related is then discarded, and unit 104 outputs the TS packet notified by separation judgment unit 103 and the TS packet generated as a result of the replacement instruction to multiplexing device 121 as the data broadcast program TS of the broadcast station in which the data broadcast program TS transmission device of embodiment 2 is provided.

Figure 12:
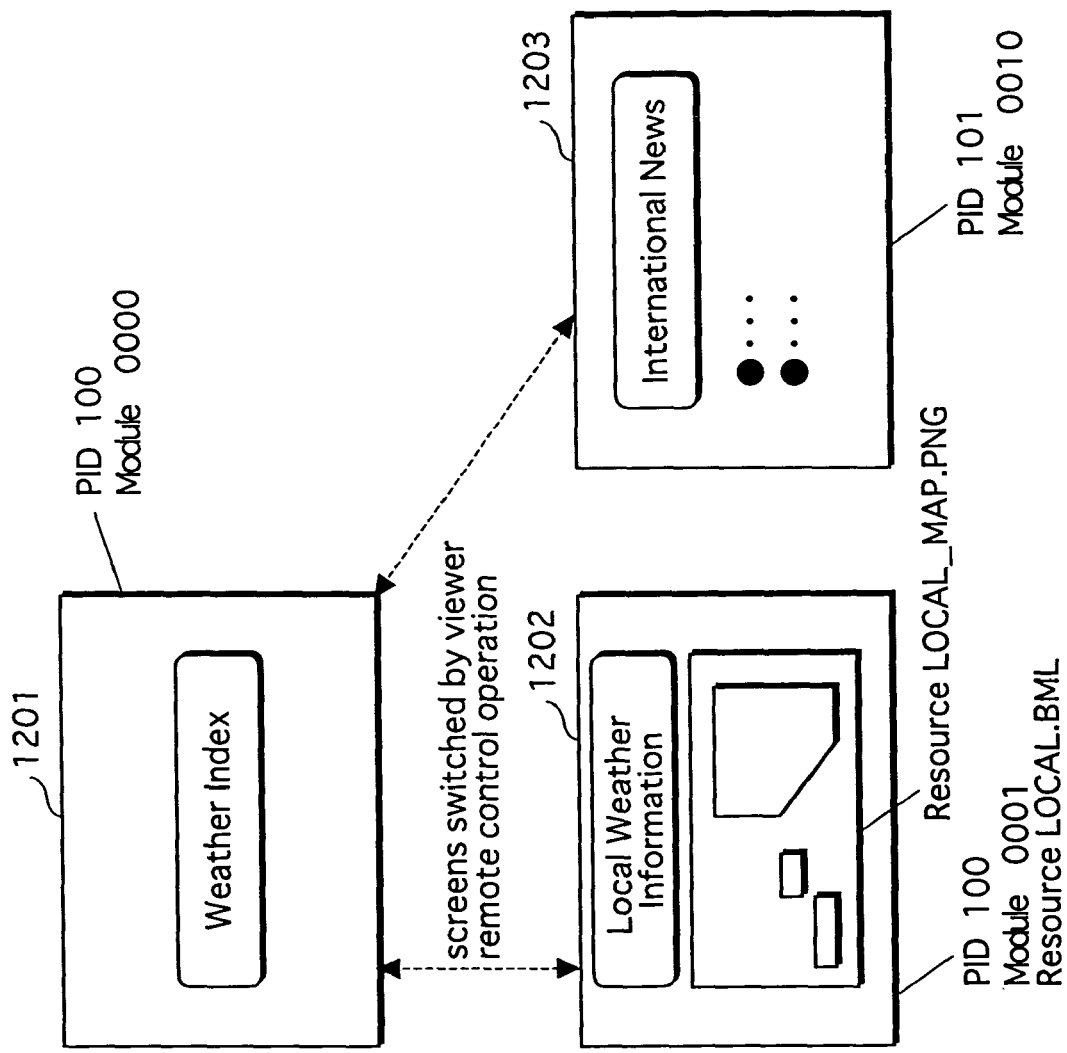
FIG. 12 shows exemplary screens of a receiving device that has received a data broadcast program TS according to embodiment 2.

Here, when selection list 401 and replacement list 1001 are stored in judgment list storage unit 102 in accordance with embodiment 2, screens 1201, 1202, and 1203 as shown in FIG. 12 can be viewed in a receiving device that receives the data broadcast program TS outputted from the data broadcast program TS transmission device of embodiment 2.

Screen 1201 displays a data broadcast program element distributed by another broadcast station 111, and screens 1202 and 1203 display data broadcast program elements produced by data broadcast program content production device 902 in the broadcast station in which the data broadcast program TS transmission device of embodiment 2 is provided.

Data broadcast program content production device 902 produces modules and resources that are to form data broadcast program elements unique the broadcast station in which the data broadcast program TS transmission device of embodiment 2 is provided.

Figure 13:
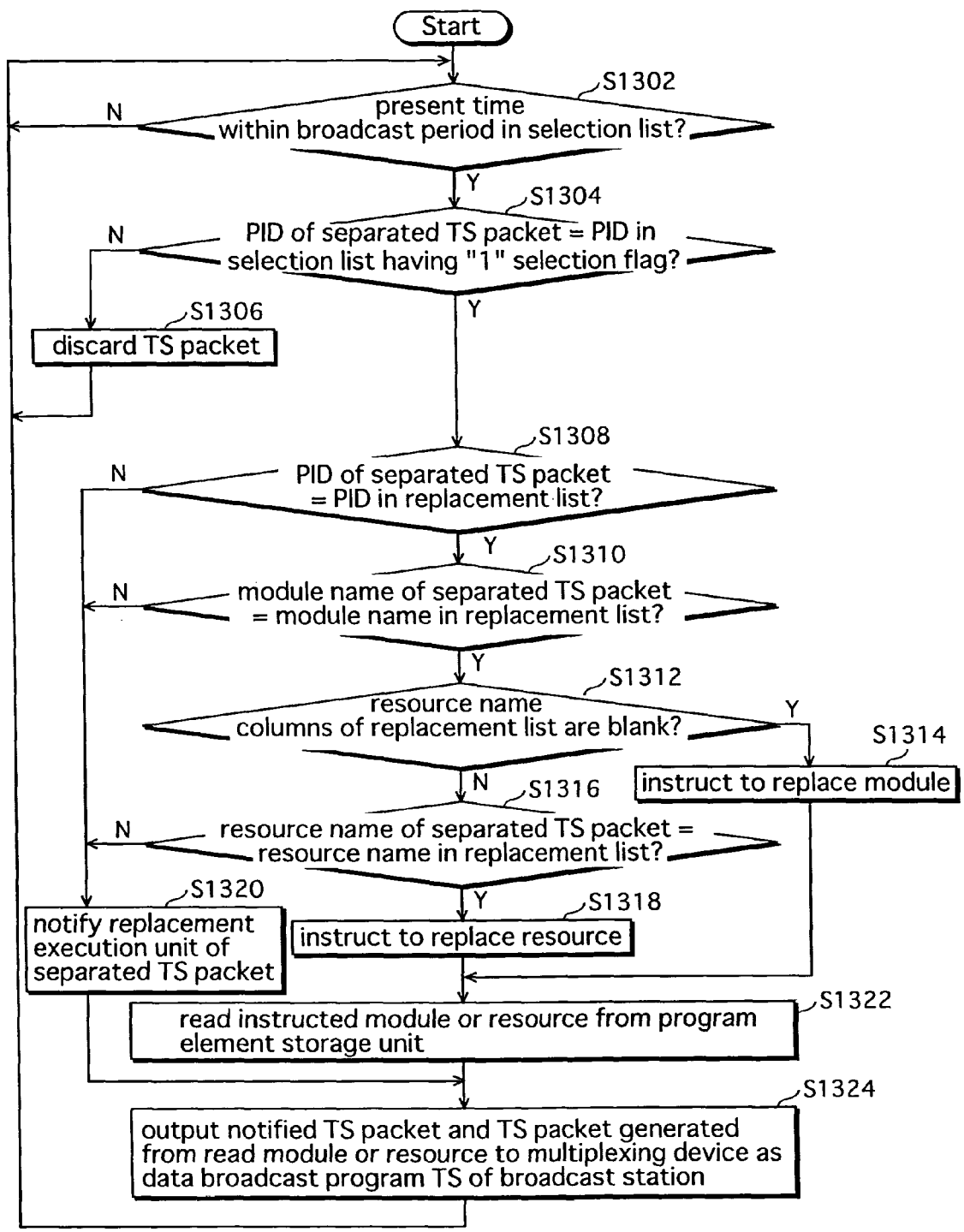
FIG. 13 is a flowchart of a processing operation according to embodiment 2.

The processing in embodiment 2 will now be described with reference to the flowchart in FIG. 13.

When notified via receiving unit 101 of a data broadcast program TS that has been net distributed by broadcast station 111, separation judgment unit 103 judges whether the present time is within a broadcast period shown in broadcast period column 403 of selection list 401 (step S1302). If judged in the negative (i.e. step S1302="NO"), unit 103 repeats the judgment of step S1302. If the judged in the affirmative (i.e. step S1302="YES"), unit 103 judges whether the PID of the TS packet separated from the data broadcast program matches a PID in PID column 404 that corresponds to a "1" selection flag in selection flag column 405 (step S1304). If judged in the negative (i.e. step S1304="NO"), unit 103 discards the separated TS packet (step S1306), and the processing returns to step S1302. If judged in the affirmative (i.e. step S1304="YES"), unit 103 judges whether the PID of the separated TS packet matches a PID in PID column 1004 of replacement list 1001 (step S1308). If judged in the affirmative (i.e. step S1308="YES"), unit 103 judges whether the module name of the separated TS packet matches a module name in column 1005 of replacement list 1001 (step S1310).

If judged in the affirmative (i.e. step S1310="YES"), separation judgment unit 103 judges whether pre-replacement and post-replacement resource name columns 1006 and 1007 are blank (step S1312). If judged in the affirmative (i.e. step S1312="YES"), unit 103 notifies replacement execution unit 104 of the matching PID and module name, instructs unit 104 to replace the module identified by the module name (step S1314), and moves on to step S1322.

If judged that columns 1006 and 1007 are not blank (i.e. step S1312="NO"), separation judgment unit 103 judges whether the resource name of the separated TS packet matches a resource name in column 1006 (step S1316). If judged in the affirmative (i.e. step S1316="YES"), unit 103 notifies replacement execution unit 104 of the matching PID and module name, and the post replacement resource name shown in column 1007, instructs unit 104 to replace the resource identified by the notified resource name (step S1318), and moves on to step S1322.

In steps S1308, S1310, and S1316, if judged in the negative (i.e. steps S1308, S1310, S1316="NO"), separation judgment unit 103 notifies replacement execution unit 104 of the separated TS packet, and moves on to step S1324.

In step S1322, replacement execution unit 104 reads from program element storage unit 901 the module or resource indicated by the replacement instruction (step S1322).

Next, replacement execution unit 104 generates TS packets from the read module or resource, outputs the generated TS packet together with the TS packet notified by separation judgment unit 103 to multiplexing device 121 as the data broadcast program TS of the broadcast station in which the data broadcast program TS transmission device of embodiment 2 is provided (step S1324), and the processing returns to step S1302.

Embodiment 3

The following description relates to an embodiment 3 of the data broadcast program TS transmission device according to the present invention.

In embodiment 2, net distributed data broadcast program elements are replaced by data broadcast program elements produced locally in the broadcast station in which the data broadcast program TS transmission device of embodiment 2 is provided. In embodiment 3, it is additionally possible to supplement net distributed data broadcast program elements with data broadcast program elements produced by a broadcast station in which the data broadcast program TS transmission device of embodiment 3 is provided.

Here, since a structure of embodiment 3 of the data broadcast program TS transmission device is the same as the structure of embodiment 2 of the data broadcast program TS transmission device, the following description refers to FIG. 9.

As in embodiment 2, receiving unit 101 receives the net distributed data broadcast program TS shown in data broadcast program content information 301 (see FIG. 3).

Judgment list storage unit 102 stores a supplementary list 1401 in addition to selection list 401 and replacement list 1001.

Supplementary list 1401 includes a data broadcast program name column 1402, a broadcast period column 1403, a PID column 1404, a module name column 1405, and a resource name column 1406.

In supplementary list 1401, a resource corresponding to a PID "100", a module name "0001" and a resource name "CM.BML", and a module corresponding to a PID "100" and a module name "0002" are shown as supplementary-data broadcast program elements.

Program element storage unit 901 stores data broadcast program elements produced by data broadcast program content production device 902. FIG. 15 shows exemplary data broadcast program elements stored in program element storage unit 901.

A data broadcast program element 1501 is identified by a PID "100", a module name "0001", and a resource name "CM.BML". A data broadcast program element 1502 is identified by PID "100" and a module name "0002".

When notified by receiving unit 101 of a data broadcast program TS that has been distributed by broadcast station 111, separation judgment unit 103 refers to selection list 401 stored in judgment list storage unit 102, selects a data broadcast program element included in the distributed data broadcast program TS, refers to replacement list 1001, and instructs replacement execution unit 104 to replace a module or a resource.

Furthermore, separation judgment unit 103 refers to supplementary list 1401 stored in judgment list storage unit 102, and when the present time is within the broadcast period shown in broadcast period column 1403, unit 103 notifies replacement execution unit 104 of either the PID and module name of the data broadcast program element (i.e. in the case of element 1502 in FIG. 15), or the PID, module name and resource name of the data broadcast program element (i.e. in the case of element 1501 in FIG. 15), and instructs unit 104 to supplement the corresponding data broadcast program element.

On receipt of a supplement instruction from separation judgment unit 103, replacement execution unit 104 reads the notified module or resource from program element storage unit 901, generates a TS packet from the read module or resource, and outputs the generated TS packet together with the TS packet notified by unit 103 and the TS packet generated as a result of the replacement instruction to multiplexing device 121 as the data broadcast program TS of the broadcast station in which the data broadcast program TS transmission device of embodiment 3 is provided.

Figure 16:
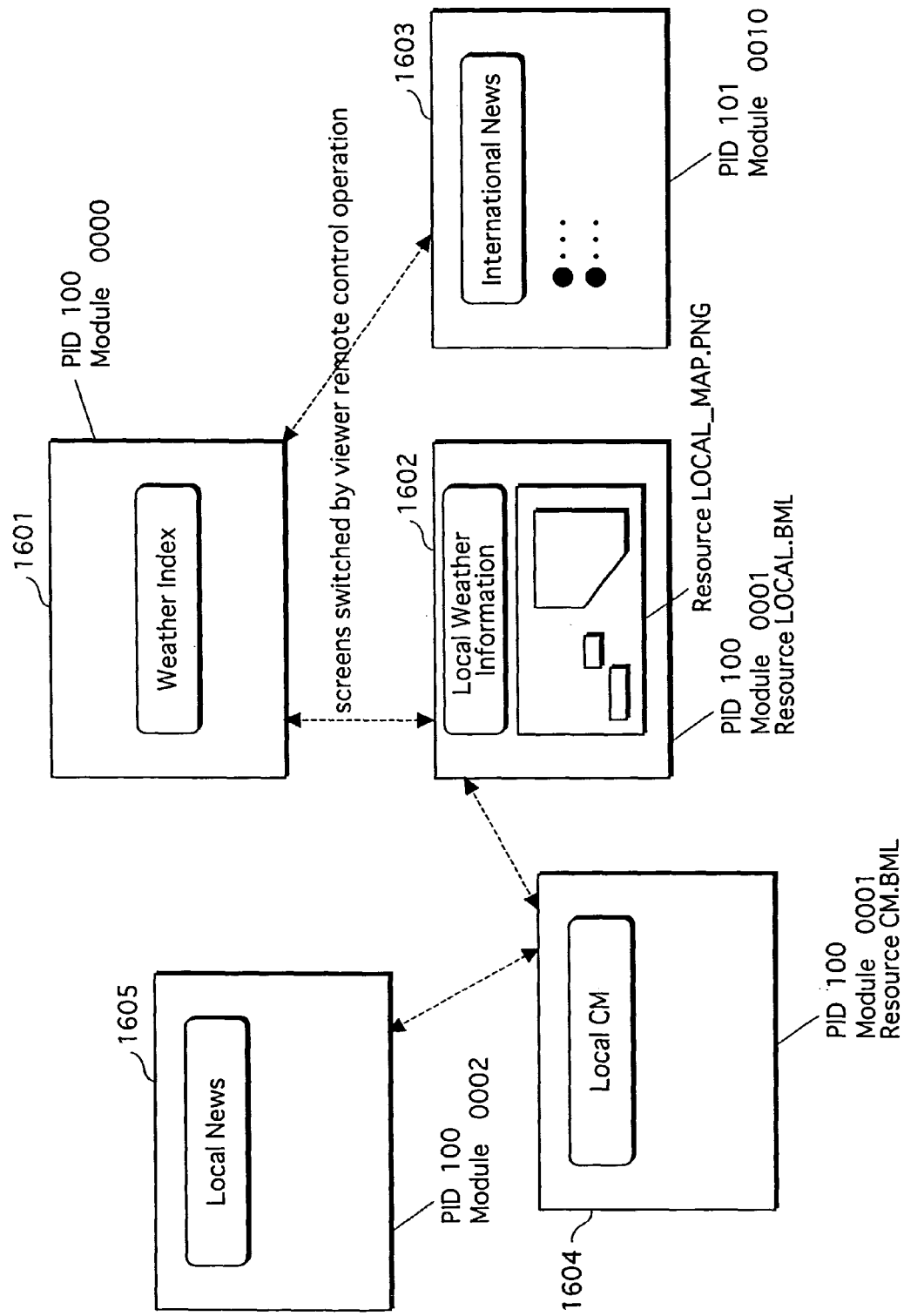
FIG. 16 shows exemplary screens of a receiving device that has received transmission of a data broadcast program TS according to embodiment 3.

As a result, the screens shown in FIG. 16 can be viewed in a receiving device that receives this data broadcast program TS.

Screen 1601 is the data broadcast program element distributed by broadcast station 111. Screens 1602 and 1603 are data broadcast program elements produced in the broadcast station in which the data broadcast program TS transmission device of embodiment 3 is provided, and result from replacing data broadcast program elements distributed by broadcast station 111. Screens 1604 and 1605 are also data broadcast program elements produced in the broadcast station in which the data broadcast program TS transmission device of embodiment 3 is provided, and result from supplementing the data broadcast program elements in screens 1601 to 1603.

Figure 17:
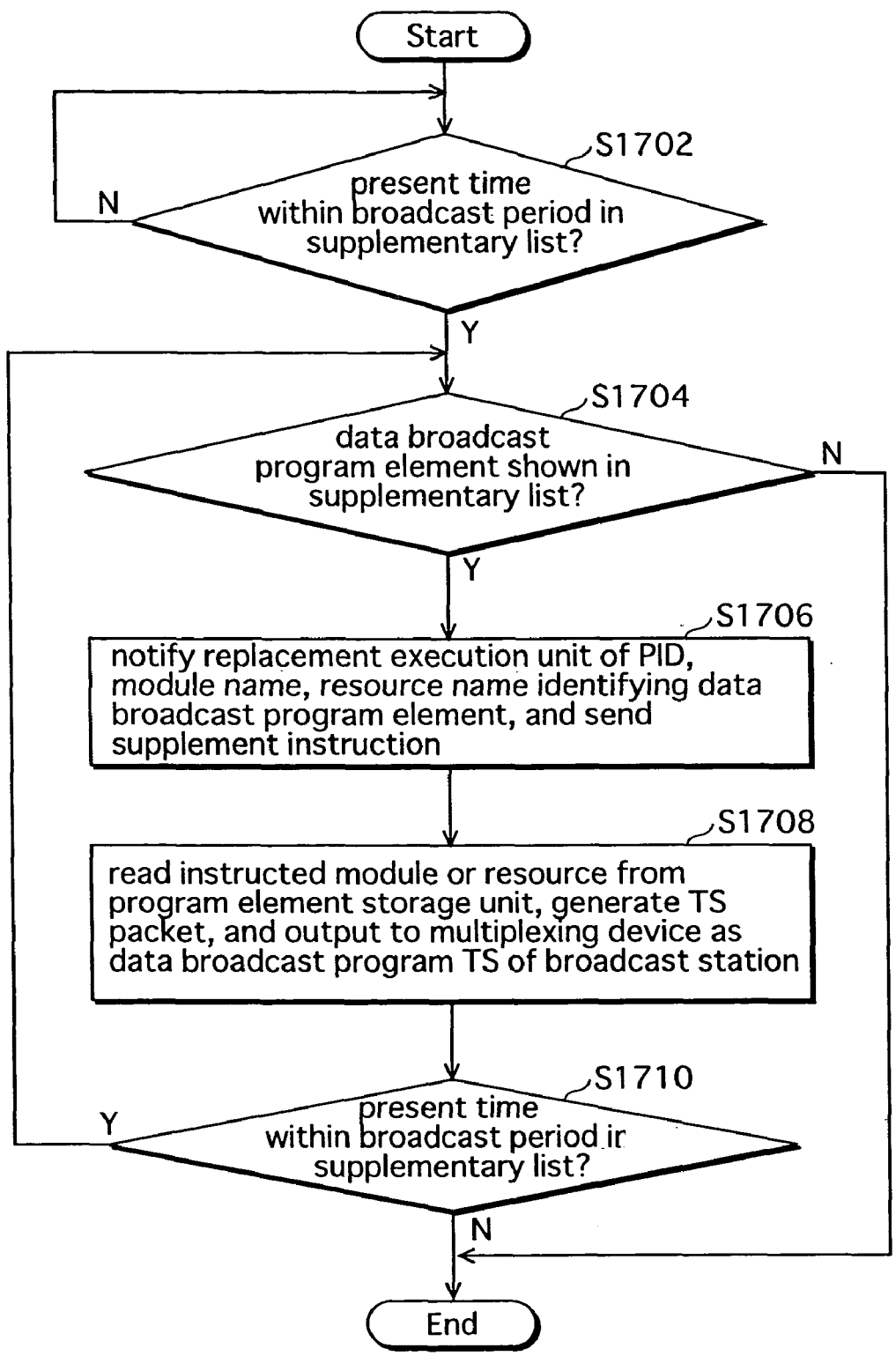
FIG. 17 is a flowchart of a processing operation according to embodiment 3.

The processing in embodiment 3 will now be described with reference to the flowchart in FIG. 17. Here, the selection of data broadcast program elements from a distributed data broadcast program TS and the replacement of data broadcast program elements is the same as in embodiment 2, and description of these operations is omitted here.

When supplementary list 1401 is stored in judgment list storage unit 102 according to embodiment 3, separation judgment unit 103 waits for the present time to be within the broadcast period shown in broadcast period column 1403 of supplementary list 1401 (step S1702), and when it is (i.e. step S1702="YES"), unit 103 refers to supplementary list 1401, and judges whether a data broadcast program element to be supplemented is shown (step S1704). If judged in the negative (i.e. step S1704="NO"), the processing is terminated, and if judged in the affirmative (i.e. step S1704="YES"), unit 103 notifies replacement execution unit 104 of the PID, module name, and resource name identifying the data broadcast program element, and instructs unit 104 to supplement the identified data broadcast program element (step S1706).

On receipt of the supplement instruction from separation judgment unit 103, replacement execution unit 104 reads the notified module or resource from program element storage unit 901, generates a TS packet from the read module or resource, and outputs the generated TS packet to multiplexing device 121 as the data broadcast program TS of the broadcast station in which the data broadcast program TS transmission device of embodiment 3 is provided (step S1708).

Separation judgment unit 103 then judges whether the present time is within the broadcast period shown in broadcast period column 1403 of supplementary list 1401 (step S1710), and if judged in the negative (i.e. step S1710="NO"), the processing is terminated, and if judged in the affirmative (i.e. step S1710="YES"), the processing returns to step S1702.

Embodiment 4

Figure 18:
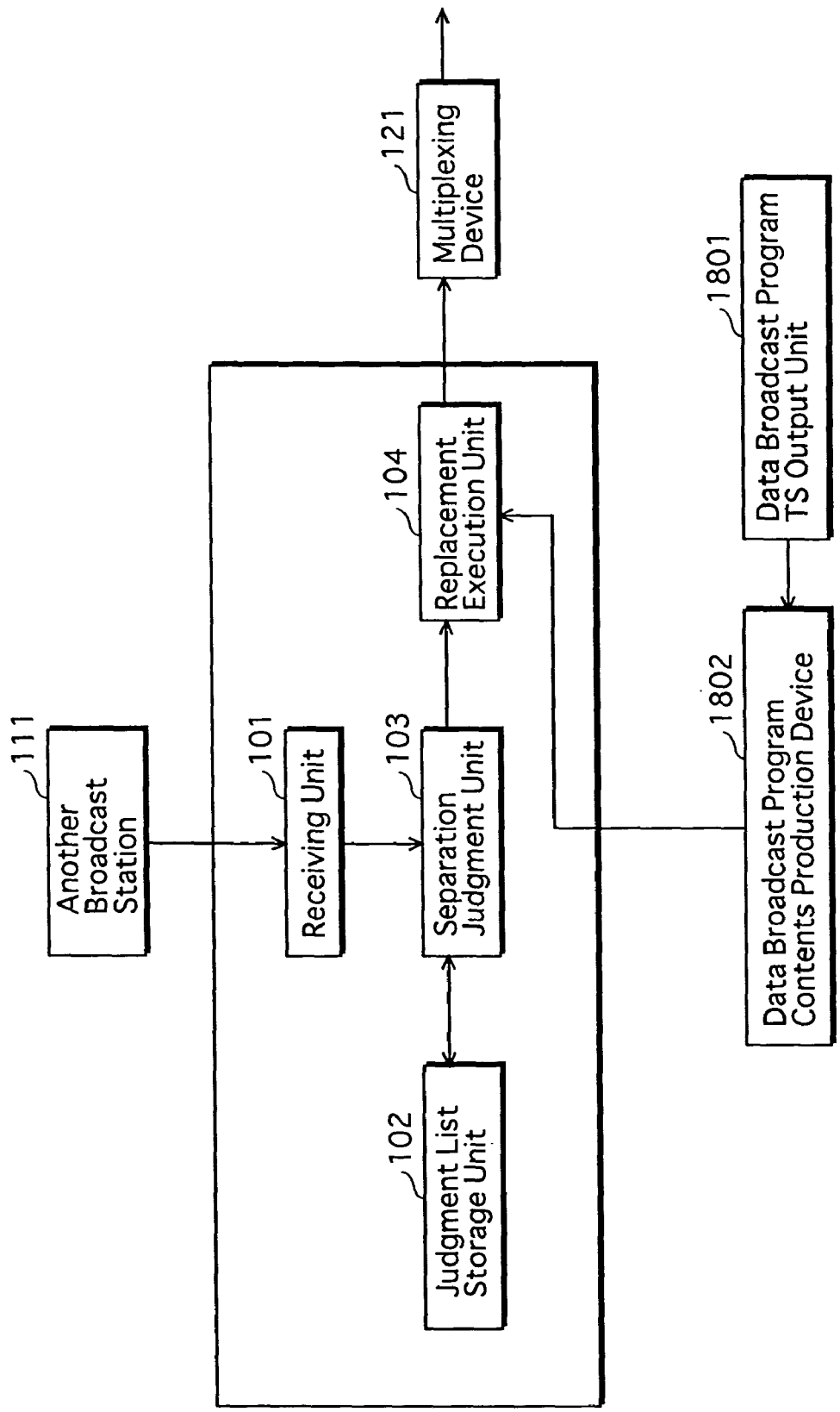
FIG. 18 is a structural diagram showing an embodiment 4 of the data broadcast program TS transmission device according to the present invention.

FIG. 18 is a structural diagram showing an embodiment 4 of the data broadcast program TS transmission device according to the present invention. Here, embodiment 4 of the data broadcast program TS transmission device is substantially the same as embodiment 1 of the data broadcast program TS transmission device.

A data broadcast program content production device 1801 is provided in a broadcast station in which the data broadcast program TS transmission device of embodiment 4 is provided. Device 1801 produces modules and resources that are to form data broadcast program elements unique to the broadcast station, and notifies a data broadcast program TS output unit 1802 of produced modules and resources.

Data broadcast program TS output unit 1802 outputs modules and resources notified by data broadcast program content production device 1801 to replacement execution unit 104.

Replacement execution unit 104 outputs TS packets notified by separation judgment unit 103 (i.e. TS packets that have been net distributed by another broadcast station 111 as in embodiment 1), and TS packets outputted by data broadcast program TS output unit 1802 to multiplexing device 121 as the data broadcast program TS of the broadcast station in which the data broadcast program TS transmission device of embodiment 4 is provided.

Embodiment 5

The following description relates to an embodiment 5 of the data broadcast program TS transmission device according to the present invention. Here, since a structure of embodiment 5 of the data broadcast program TS transmission device is the same as the structure of embodiment 2 of the data broadcast program TS transmission device, the following description refers to FIG. 9.

Figure 19:
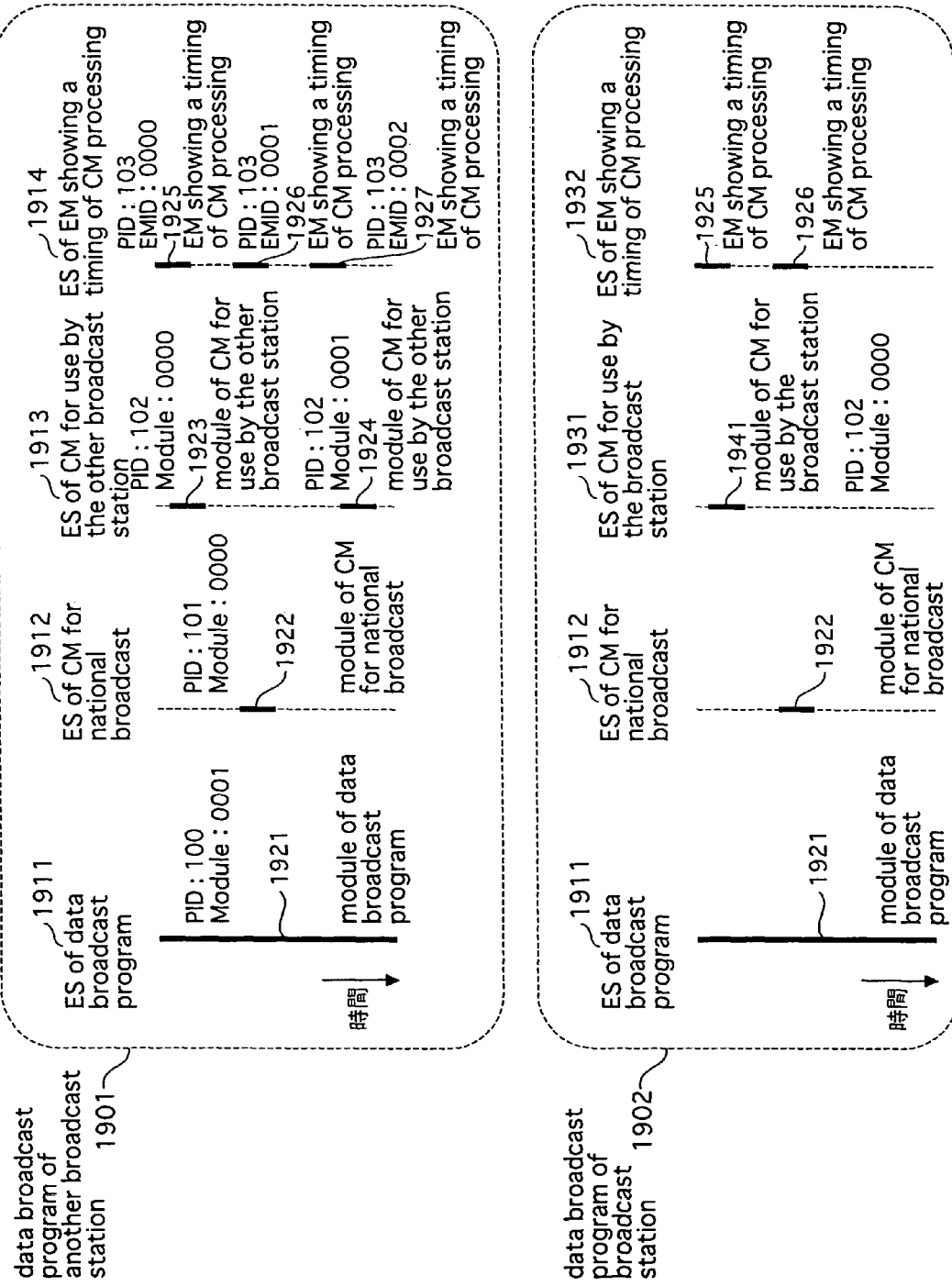
FIG. 19 shows an exemplary content of data broadcast programs to be broadcast by the other broadcast station and a broadcast station in which an embodiment 5 of the data broadcast program TS transmission device according to the present invention is provided.

FIG. 19 shows an exemplary content of data broadcast program transport streams transmitted by (i) another broadcast station 111 and (ii) a broadcast station in which the data broadcast program TS transmission device of embodiment 5 is provided.

In the top half of FIG. 19 is shown the content of a data broadcast program TS that is broadcast as a data broadcast program 1901 by broadcast station 111 as well as being net distributed by broadcast station 111. Data broadcast program 1901 broadcast by broadcast station 111 includes an elementary stream (ES) 1911 of the actual data broadcast program, an ES 1912 of a commercial message (CM) for national use, an ES 1913 of CMs for use by broadcast station 111, and an ES of an event message (EM) showing a timing of the CM processing.

ES 1911 includes a module 1921 of the data broadcast program. Module 1921 is a data broadcast program element structuring the data broadcast program, and is contained within a TS packet that has attached a PID "100" and a module name "0001".

ES 1912 includes a module 1922 of the CM for national use. Module 1922 is a data broadcast program element structuring the data broadcast program, and is contained within a TS packet that has attached a PID "101" and a module name "0000". In the given example, this CM may be viewed together with the data broadcast program in, for example, a broadcast station targeted for distribution.

ES 1913 includes modules 1923 and 1924 of CMs for use by broadcast station 111. Modules 1923 and 1924 are data broadcast program elements structuring the data broadcast program. Module 1923 is contained within a TS packet that has attached a PID "102" and a module name "0000", and module 1924 is contained within a TS packet that has attached PID "102" and module name "0001". In the given example, these CMs may be viewed in a receiving device that receives direct transmission of broadcasts from broadcast station 111.

ES 1913 includes EMs 1925, 1926, and 1927 showing a timing of the CM processing. EMs 1925, 1926, and 1927 are data broadcast program elements structuring the data broadcast program. EM 1925 is contained within a TS packet that has attached a PID "103" and an event message identifier (EMID) "0000", EM 1926 is contained within a TS packet that has attached PID "103" and an EMID "0001", and EM 1927 is contained within a TS packet that has attached PID "103" and an EMID "0002". Here, EM 1925 is a trigger for notifying a receiving device of the processing timing of module 1923, EM 1925 is a trigger for notifying a receiving device of the processing timing of module 1922, and EM 1927 is a trigger for notifying a receiving device of the processing timing of module 1924.

Thus, for example, if transmission of a data broadcast program "shopping information" is received by a receiving device that receives direct transmission of broadcasts from broadcast station 111, module 1921 is displayed for the time period that the data broadcast program is broadcast.

If transmission of EM 1925 showing the processing timing of module 1923 (i.e. relating to CM 1913) is received, the receiving device stores the received module 1923 in memory and may also display the received module 1923.

EM 1926 shows the timing by which module 1922 (i.e. relating to CM 1912) is stored in memory or displayed, and EM 1927 shows the timing by which module 1924 (i.e. relating to CM 1914) is stored in memory or displayed.

Here, in the given example, the processing start timing of the modules relating to ES 1912 (i.e. CM for national use) and ES 1913 (i.e. CMs for use by broadcast station 111) are shown in the same elementary stream (i.e. ES 1914). However, these processing start timings may be shown in separate elementary streams. That is, the processing start timings may be shown in elementary streams contained in transport packets that have different PIDs attached.

Furthermore, as mention above, in embodiment 5 the processing timing (i.e. of storing in memory and displaying) of modules 1922, 1923, and 1924 relating to the CMs is shown in elementary streams 1926, 1925, and 1927, respectively. However, elementary streams may be omitted from the structure, and the storing to memory and displaying may be conducted according to the timing at which transmission of modules 1922, 1923, and 1924 relating to the CMs is received.

Likewise, EMs may be omitted from the structure, and modules 1922, 1923, and 1924 relating to the CMs may be processed when (i) the version of module 1921 relating to the data broadcast program is updated, or (ii) when the version of modules 1922, 1923, and 1924 is updated.

Furthermore, in embodiment 5, when modules 1922, 1923, and 1924 relating to the CMs are only stored in memory and not displayed, the image display of modules 1922, 1923, and 1924 is controlled by module 1921, which relates to the data broadcast program. However, it is possible to display modules 1922, 1923, and 1924 at the time that they are stored in memory, without requiring the control of module 1921.

In the data broadcast program TS transmission device of embodiment 5, receiving unit 101 receives a data broadcast program TS of data broadcast program 1901 that has been net distributed by broadcast station 111.

Judgment list storage unit 102 stores a selection list 2001 as shown in FIG. 20 and a replacement list 2101 as shown in FIG. 21.

In selection list 2001, selection flags relating to the data broadcast program elements of the data broadcast program "shopping information" distributed by broadcast station 111 are shown in a selection flag column 2003. The data broadcast program elements are identified by the PIDs and the module names/EMIDs shown in selection list 2001. Specifically, the module of the ES of the data broadcast program and the module of the ES of the CMs are identified by the PIDs and the module names in selection list 2001, and the EMs are identified by the PIDs and the EMIDs in selection list 2001.

Separation judgment unit 103 refers to selection list 2001, discards module 1924 identified by PID "102" and module name "0001", and EM 1927 identified by PID "103" and EMID "0002", and notifies replacement execution unit 104 of the remaining selected data broadcast program elements.

Replacement list 2101 shows which of the data broadcast program elements of the data broadcast program "shopping information" are for replacement. In the given example, the data broadcast program element identified by PID "102" and module name "0000" is to be replaced.

Separation judgment unit 103 notifies replacement execution unit 104 of PID "102" and module name "0000", and instructs unit 104 to perform the replacement.

Program element storage unit 901 stores a data broadcast program element of a CM to be used by the broadcast station in which the data broadcast program TS transmission device of embodiment 5 is provided. This data broadcast program element was produced by data broadcast program content production device 902, and is identified by PID "101" and module name "0000".

On receipt of a replacement instruction from separation judgment unit 103, replacement execution unit 104 reads from program element storage unit 901 the data broadcast program element notified by unit 103 (i.e. the data broadcast program element produced by data broadcast program content production device 902), generates a TS packet from the read data broadcast program element, and replaces the TS packet notified by unit 103 (i.e. the TS packet distributed by broadcast station 111) with the generated TS packet.

In the bottom half of FIG. 19 is shown the content of a data broadcast program 1902 that is based on the net distributed data broadcast program 1901 and that is to be outputted by the data broadcast program TS transmission device of embodiment 5. Data broadcast program 1902 is structured by ES 1911 relating to the actual data broadcast program, ES 1912 relating to the CM for national use, an ES 1931 relating to a CM for use by the broadcast station in which the data broadcast program TS transmission device of embodiment 5 is provided, and an ES 1932 relating to event messages 1925 and 1926 showing the timing of the CM processing. Here, elementary streams, modules, and event messages having the same numbering as in the top half of FIG. 19 are the same as data broadcast program elements distributed by broadcast station 111.

ES 1931 was produced by data broadcast program content production device 902, and a module 1941 is structured from a TS packet generated by replacement execution unit 104.

Furthermore, EM 1927 showing a timing of the CM processing has been eliminated from ES 1914, and is therefore not included in ES 1932.

In the given example, module 1941 may be viewed in a receiving device that receives direct transmission of broadcasts from the broadcast station in which the data broadcast program TS transmission device of embodiment 5 is provided.

Here, in embodiment 5, module 1922 relating to the CM for national use is used as distributed. However, it is of course possible to replace this module with a module relating to a CM for use by the broadcast station in which the data broadcast program TS transmission device of embodiment 5 is provided.

Here, the operation of the above receiving device is substantially the same as the operation of the receiving device that receives broadcasts from broadcast station 111.

Furthermore, in embodiment 5, module 1924 relating to the CM for use by broadcast station 111 and EM 1927 showing the timing of the CM processing of module 1924 are discarded. However, embodiment 5 may be realized, for example, by replacing module 1924 and EM 1927 with null packets.

Furthermore, although in embodiment 5 the discarding of a module and a corresponding event message is described, it is of course possible to supplement a module relating to a CM for use by the broadcast station in which the data broadcast program TS transmission device of embodiment 5 is provided, and also to supplement a corresponding event message.

Furthermore, in embodiment 5, module 1923 (i.e. identified by PID "102" and module name "0000") relating to the CM for use by broadcast station 111 is replaced by module 1941 (i.e. identified by the same PID "102" and module name "0000") relating to the CM for use by the broadcast station in which the data broadcast program TS transmission device of embodiment 5 is provided, and data broadcast program content information 301 is configured such that module 1924 is then discarded. However, the data broadcast program content information in broadcast station 111 may be set to show for each structural element, whether the structural element is for replacement or discarding. Then, selection lists, replacement lists and the like can be generated accordingly in a data broadcast program TS transmission device that receives such information.

Embodiment 6

The following description relates to an embodiment 6 of the data broadcast program TS transmission device according to the present invention. In embodiment 6, concrete examples of the replacement of the modules and resources described in embodiment 2 are given. Here, the description refers to the structure of the data broadcast program TS transmission device shown in FIG. 9.

Replacement execution unit 104 is notified by separation judgment unit 103 of TS packets separated from the data broadcast program TS net distributed by broadcast station 111 that contain data broadcast program elements for inclusion in the data broadcast program content of the broadcast station in which the data broadcast program TS transmission device of embodiment 6 is provided.

Furthermore, separation judgment unit 103 instructs replacement execution unit 104 to replace the module identified by PID "101" and module name "0010" attached to the notified TS packets.

Figure 22:
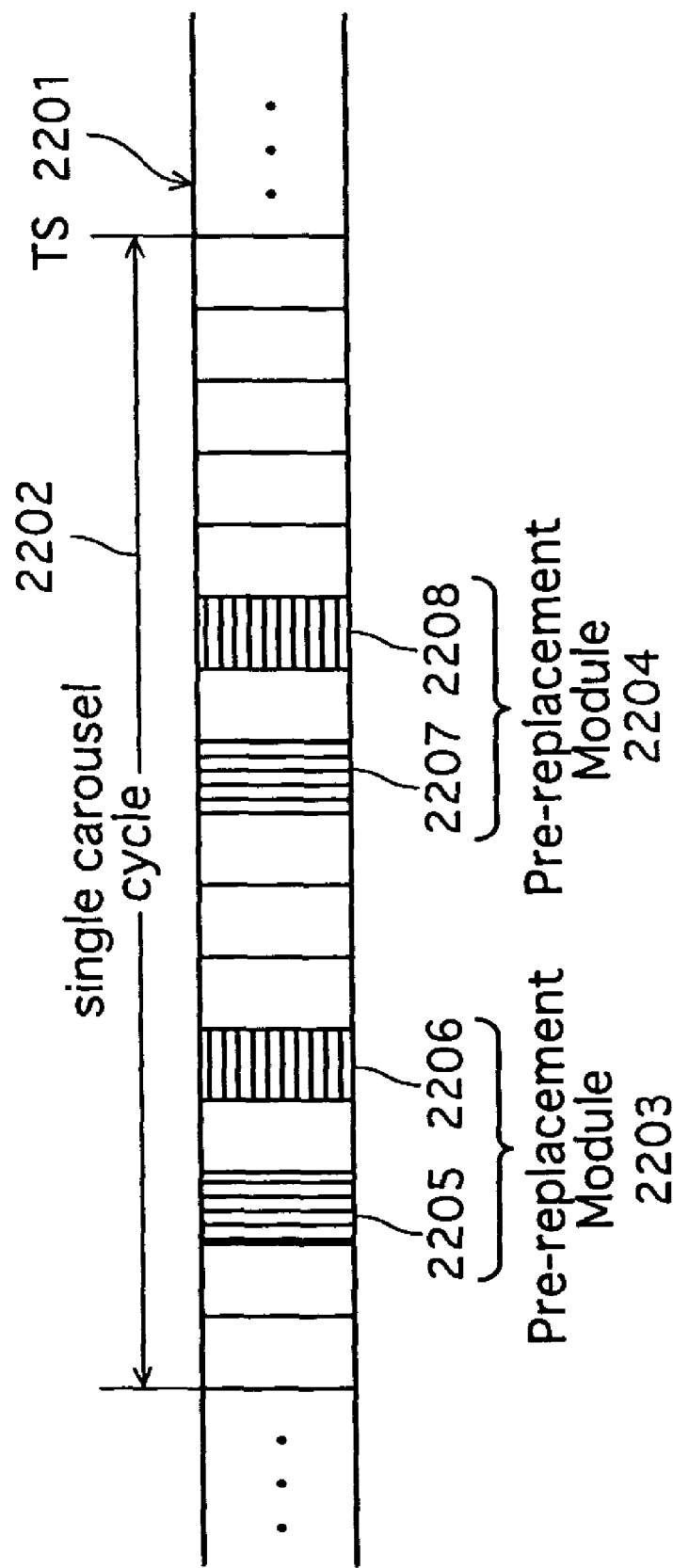
FIG. 22 shows an exemplary distributed TS prior to replacement processing being performed in an embodiment 6 of the data broadcast program TS transmission device according to the present invention.

FIG. 22 shows the data broadcast program TS that includes the TS packets notified to replacement execution unit 104 by separation judgment unit 103. The module identified by PID "101" and module name "0010" prior to replacement is included in two modules 2203 and 2204 in a carousel cycle 2202 of data broadcast program TS 2201. Module 2203 is structured from two TS packets 2205 and 2206, and module 2203 is also structured from two TS packets 2207 and 2208. In other words, modules 2203 and 2204 are each the equivalent of two TS packets in size. Furthermore, modules 2203 and 2204 are each transmitted once in carousel cycle 2202.

Replacement execution unit 104 is set in advance to either maintain (i) the bandwidth of the data broadcast program TS to be transmitted by the broadcast station in which the data broadcast program TS transmission device of embodiment 6 is provided, or (ii) the number of transmission per carousel cycle, with respect to a module or resource to which a replacement instruction relates.

If set to maintain a bandwidth, replacement execution unit 104, on receipt of a replacement instruction, reads the one or more modules identified by the notified PIDs and module names from program element storage unit 901, generates TS packets from the read modules, and replaces TS packets 2205, 2206, 2207, and 2208 structuring pre-replacement modules 2203 and 2204 with the generated TS packets.

Here, since post-replacement modules may be larger or smaller than pre-replacement modules, the number of TS packets may vary, which in turn may affect the number of modules transmitted per carousel cycle.

FIG. 23A shows a data broadcast program TS 2301 when the post-replacement modules are half the size of the pre-replacement modules. FIG. 23B shows a data broadcast program TS 2302 when the post-replacement modules are twice the size of the pre-replacement modules.

In data broadcast program TS 2301, the post-replacement modules are each structured by a single TS packet. In this case, the module identified by PID "101" and module name "0010" is included after replacement in four modules 2304, 2305, 2306, and 2307 in carousel cycle 2303.

In data broadcast program TS 2302, the post-replacement module is structured by four TS packets. In this case, the module identified by PID "101" and module name "0010" is included after replacement in a single module 2309, and module 2309 is structured by four TS packets 2310, 2311, 2312, and 1213.

On the other hand, if replacement execution unit 104 is set to maintain the number of transmissions per carousel cycle, unit 104, on receipt of a replacement instruction, reads the modules identified by the notified PIDs and module names from program element storage unit 901, generates TS packets from the read modules, and compares the size of the post-replacement modules with the size of the pre-replacement modules.

If the post-replacement modules are half the size of the pre-replacement modules, then since two modules 2203 and 2204 are included in carousel cycle 2202 of pre-replacement data broadcast program TS 2201 (see FIG. 22) in the given example, the post-replacement data broadcast program TS will also be set to include two modules.

To achieve this, replacement execution unit 104 replaces half of the TS packets structuring the pre-replacement modules with null packets.

In contrast, if the post-replacement modules are twice the size of the pre-replacement modules, then since two modules 2203 and 2204 are included in carousel cycle 2202 of pre-replacement data broadcast program TS 2201 (see FIG. 22) in the given example, the post-replacement data broadcast program TS is again also set to include two modules.

To achieve this, replacement execution unit 104 replaces the two TS packets structuring each pre-replacement module with TS packets structuring a single post-replacement module, and inserts an additional post-replacement module per carousel cycle.

FIG. 24A shows data broadcast program TS 2301 when the post-replacement modules are half the size of the pre-replacement modules. FIG. 24B shows data broadcast program TS 2302 when the post-replacement modules are twice the size of the pre-replacement modules.

In a data broadcast program TS 2401, the post-replacement modules are each structured by a single TS packet. In carousel cycle 2403, the replacement of TS packets with null packets results in a null packet 2406 being inserted between post-replacement modules 2404 and 2405 identified by PID "101" and module name "0010", and a null packet 2407 being inserted after module 2405.

In a data broadcast program TS 2402, each post-replacement module is structured by four TS packets. Two post-replacement modules 2409 and 2410 are included in carousel cycle 2408. Modules 2409 and 2410 are each structured by four TS packets 2411, 2412, 2413, 2413, and 2415, 2416, 2417, 2418, respectively. In this case, the fact that there are more post-replacement TS packets than pre-replacement TS packets 2205 to 2208 shows that extra TS packets have been inserted into carousel cycle 2408. In this way, the number of modules transmitted in carousel cycles 2403 and 2408 can be maintained, although maintaining the number of modules per carousel cycle may result in changes to the bandwidth.

Furthermore, when the size of a module or resource targeted for replacement is the same as the size of a replacement module or resource stored in program element storage unit 901, maintaining the bandwidth yields the same result as maintaining the number of transmissions per carousel cycle.

Embodiment 7

The following description relates to an embodiment 7 of the data broadcast program TS transmission device according to the present invention. Here, since a structure of embodiment 7 of the data broadcast program TS transmission device is the same as the structure of embodiment 2 of the data broadcast program TS transmission device, the following description refers to FIG. 9.

As in embodiment 2, embodiment 7 involves the replacement of a net distributed module or resource with a module or resource produced in a broadcast station in which the data broadcast program TS transmission device of the present embodiment is provided. However, instead of a module or resource being displayed by a receiving device that receives a data broadcast program TS containing the module or resource, in embodiment 7 the module or resource is used for control in the receiving device.

The top half of FIG. 25 shows exemplary data broadcast program elements 2501 distributed by broadcast station 111. The bottom half of FIG. 25 shows exemplary data broadcast program elements 2502 to be outputted by the data broadcast program TS transmission device of embodiment 7.

Distributed data broadcast program elements 2501 include a resource 2511 and a program table 2521 which is also a resource.

Resource 2511 includes a script 2512 showing a station selection. Here, when a station selection operation is conducted in a receiving device within an area of broadcast station 111 that results in the selection, for example, of a program number "0222", script 2511 does not shows the actual program number "0222" but rather a provisional program name 2513. Program table 2521, which is included together with resource 2511 in data broadcast program elements 2501, shows the correspondence between provisional program name 2513 "SERVICE_A" and the actual program number "0222".

Program table 2521 includes a provisional program name column 2522 and an actual program number column 2523.

Here, if the actual program number were to be shown in resource 2511, then resource 2511 would have to be replaced in a broadcast station that receives distribution of resource 2511. The actual program number is only used for program selection in the broadcast area of broadcast station 111 that distributes resource 2511, and cannot be used in the broadcast area of a broadcast station that receives resource 2511. Thus, by providing a program table that shows the correspondence between provisional program name 2513 and the actual program number, resource 2511 can be treated like any other data broadcast program element in a broadcast station that receives resource 2511.

In the broadcast station in which the data broadcast program TS transmission device of embodiment 7 is provided, data broadcast program content production device 902 generates a program table 2531 (i.e. the equivalent of program table 2521 in broadcast station 111) showing the correspondence between provisional program name 2513 and the actual program number "0666" used for program selection by a receiving device in the broadcast area of the broadcast station. Program table 2531 is shown in the bottom half of FIG. 25 as including data broadcast program elements 2502 to be outputted by the data broadcast program TS transmission device of embodiment 7.

Program table 2531 is stored in program element storage unit 901. Furthermore, although program table 2531 has attached the same PID and module name as the distributed program table 2521, the attached resource name is unique to the broadcast station in which the data broadcast program TS transmission device of embodiment 7 is provided.

Judgment list storage unit 102 stores a replacement list showing the replacement of program table 2521 with program table 2531.

Receiving unit 101 receives transmission from broadcast station 111 of the data broadcast program TS that includes data broadcast program element 2521, and notifies separation judgment unit 103 of the received data broadcast program TS.

Separation judgment unit 103 separates the TS packets from the notified data broadcast program TS and, in accordance with a selection list stored in judgment list storage unit 102, notifies replacement execution unit 104 of TS packets structuring modules and/or resources that are for inclusion in the data broadcast program TS of the broadcast station in which the data broadcast program TS transmission device of embodiment 7 is provided.

Furthermore, in accordance with the replacement list, separation judgment unit 103 instructs replacement execution unit 104 to replace program table 2521 included within the notified TS packets.

In accordance with the replacement instruction, replacement execution unit 104 reads program table 2531 from program element storage unit 901, and generates a TS packet from the read program table 2531. Unit 104 then replaces the TS packet that requires replacing with the generated TS packet, and outputs the generated TS packet together with the notified TS packets that do not require replacing to multiplexing device 121 as the data broadcast program TS of the broadcast station in which the data broadcast program TS transmission device of embodiment 7 is provided.

A data broadcast program TS that includes data broadcast program elements 2502 shown in the bottom half of FIG. 25 is then outputted by the data broadcast program TS transmission device of embodiment 7.

In data broadcast program elements 2502, program table 2531 is included in place of the distributed program table 2521.

Distributed resource 2511 is used in an unaltered state in the data broadcast program TS outputted by the data broadcast program TS transmission device of embodiment 7. In this way, a receiving device that receives the outputted data broadcast program TS is able to use provisional program name 2513 "SERVICE_A" for station selection by referring to program table 2531 which shows the correspondence with actual program number "0666".

Since the actual program number to which resource 2511 relates can be obtained indirectly by referring to program table 2531, only the replacement of the program table showing the correspondence between changed items, and not resource 2511, is required. As a result, data broadcast program elements can be changed with great efficiency.

Here, it is possible to structure program tables 2521 and 2531 in text format or binary format. Moreover, although the program tables are described in embodiment 7 as being resources, they may be broadcast as modules.

Furthermore, the above embodiments are described in terms of only a data broadcast program TS being distributed by another broadcast station 111 to the broadcast station in which a data broadcast program TS transmission device of the present invention is provided. However, the transport stream distributed by broadcast station 111 may be provided by multiplexing a data broadcast program TS with a broadcast program TS.

Furthermore, although the data broadcast program TS transmission device is described in the above embodiments with reference to the structures shown in FIGS. 1, 9, and 18, the present invention may be realized by a computer program that has a computer perform the functions of the various structural components. Moreover, the computer program may be stored on a computer-readable storage medium, and applied by a data broadcast program TS transmission device that transmits a data broadcast program TS based on a net distributed data broadcast program TS.

Furthermore, the data broadcast program TS transmission device in the above embodiments is described as receiving an MPEG-2 format data broadcast program TS distributed by another broadcast station, and as transmitting a data broadcast program TS based on the received data broadcast program TS. However, the present invention may of course be applied to receive, not an MPEG-2 transport stream, but a data stream formed from a collection of Internet protocol (IP) packets that comply with Internet protocols, and to transmit a data broadcast program data stream based on the received data stream.

INDUSTRIAL APPLICABILITY

When a data broadcast program is multiplexed with a digital broadcast program to provide a transport stream for broadcasting by a broadcast station in which a data broadcast program TS transmission device according to the present invention is provided, the data broadcast program TS transmission device is able to generate the transport stream based on a first data broadcast program TS distributed by another broadcast station. As a result, the data broadcast program TS transmission device of the present invention can be applied in a broadcast station to improve efficiency beyond that achievable by conventional technology, which requires the broadcast station to produce all of the structural elements of data broadcast programs.

The invention claimed is:

1. A data broadcast program transport stream transmission device provided in a broadcast station, and for (i) receiving a first transport stream having multiplexed thereon a first content that includes one or more source elements and (ii) transmitting a data broadcast program transport stream based on the received first TS, comprising:

a judgment list storage unit operable to store a judgment list that shows for each source element, whether the source element is for inclusion in a data broadcast program content of the broadcast station;

a separation judgment unit operable to separate each source element from the first TS, and to judge in accordance with the judgment list whether the separated source element is for inclusion in the data broadcast program content;

an output unit operable to output the data broadcast program TS with the separated source element included in the data broadcast program content if the separation judgment unit judges in the affirmative; and a local element storage unit operable to store one or more local elements produced in the broadcast station, wherein the judgment list storage unit further has:

a replacement list storage subunit operable to store a replacement list that shows the replacement of source elements judged to be for inclusion by the separation judgment unit with local elements stored in the local element storage unit, the separation judgment unit further has:

a replacement judgment subunit operable to, if the replacement judgment subunit judges in the affirmative, refer to the replacement list and judge whether the separated source element is for replacement, a notification subunit sends a replacement instruction to the output unit if the replacement judgment subunit judges in the affirmative, and the output unit has:

a reading subunit operable to, if a replacement instruction is received from the notification subunit, read a local element indicated in the replacement instruction from the local element storage unit;

a generation output subunit operable to generate the data broadcast program TS based on local elements read by the reading subunit and source elements notified by the notification subunit, and for outputting the generated data broadcast program TS;

a first setting subunit operable to set the data broadcast program TS to maintain the same bandwidth as the first TS;

a repeat multiplexing subunit operable to, if a TS packet surplus in a carousel cycle of the data broadcast program TS arises because a local element is smaller in size than a source element shown in the replacement list for replacement, repeatedly multiplex a TS packet generated from the local element onto the data broadcast program TS to eliminate the surplus; and a cycle-delay packet multiplexing subunit operable to, if a TS packet shortage in a carousel cycle of the data broadcast program TS arises because a local element is larger in size than a source element shown in the replacement list for replacement, multiplex any surplus TS packets generated from the local element onto the data broadcast program TS in a subsequent carousel cycle.

2. A data broadcast program transport stream transmission device provided in a broadcast station, and for (i) receiving a first transport stream having multiplexed thereon a first content that includes one or more source elements and (ii) transmitting a data broadcast program transport stream based on the received first TS, comprising:

a judgment list storage unit operable to store a judgment list that shows for each source element, whether the source element is for inclusion in a data broadcast program content of the broadcast station;

a separation judgment unit operable to separate each source element from the first TS, judge in accordance with the judgment list whether the separated source element is for inclusion in the data broadcast program content;

an output unit operable to output the data broadcast program TS with the separated source element included in the data broadcast program content if the separation judgment unit judges in the affirmative; and a local element storage unit operable to store one or more local elements produced in the broadcast station, wherein the judgment list storage unit further has:

a replacement list storage subunit operable to store a replacement list that shows the replacement of source elements judged to be for inclusion by the separation judgment unit with local elements stored in the local element storage unit, the separation judgment unit further has:

a replacement judgment subunit operable to, if the replacement judgment subunit judges in the affirmative, refer to the replacement list and judge whether the separated source element is for replacement, a notification subunit sends a replacement instruction to the output unit if the replacement judgment subunit judges in the affirmative, and the output unit has:

a reading subunit operable to, if a replacement instruction is received from the notification subunit, read a local element indicated in the replacement instruction from the local element storage unit;

a generation output subunit operable to generate the data broadcast program TS based on local elements read by the reading subunit and source elements notified by the notification subunit, and for outputting the generated data broadcast program TS;

a second setting subunit operable to set the data broadcast program TS to maintain an equal number of elements transmitted per carousel cycle as the first TS;

a null packet multiplexing subunit operable to, if a TS packet surplus in a carousel cycle of the data broadcast program TS arises because a local element is smaller in size than a source element shown in the replacement list for replacement, multiplex any surplus TS packets onto the data broadcast program TS as null packets; and an insert-packet multiplexing subunit operable to, if a TS packet shortage in a carousel cycle of the data broadcast program TS arises because a local element is larger in size than a source element shown in the replacement list for replacement, forcibly insert a TS packet generated from the local element onto the data broadcast program TS in the carousel cycle.

3. A method of transmitting a data broadcast program with data broadcast program transport stream transmission device provided in a broadcast station, for (i) receiving a first transport stream having multiplexed thereon a first content that includes one or more source elements and (ii) transmitting a data broadcast program transport stream based on the received first TS, comprising the steps of:

storing, in a judgment list storage unit, a judgment list that shows for each source element, whether the source element is for inclusion in a data broadcast program content of the broadcast station;

separately, in a separation judgment unit, each source element from the first TS, and judging in accordance with the judgment list whether the separated source element is for inclusion in the data broadcast program content;

outputting, in an output unit, the data broadcast program TS with the separated source element included in the data broadcast program content if the separation judgment unit judges in the affirmative; and storing, in a local element storage unit, one or more local elements produced in the broadcast station, wherein the judgment list storage unit further has a replacement list storage subunit;

storing a replacement list in the replacement list storage subunit, that shows the replacement of source elements judged to be for inclusion by the separation judgment unit with local elements stored in the local element storage unit, wherein the separation judgment unit further has a replacement judgment subunit;

judging when the replacement judgment subunit judges in the affirmative, to refer to the replacement list and to judge whether the separated source element is for replacement, sending, with a notification subunit, a replacement instruction to the output unit if the replacement judgment subunit judges in the affirmative, and the output unit has a reading subunit;

reading, with the reading subunit if a replacement instruction is received from the notification subunit, a local element indicated in the replacement instruction from the local element storage unit;

generating, with a generation output subunit, the data broadcast program TS based on local elements read by the reading subunit and source elements notified by the notification subunit, and outputting the generated data broadcast program TS;

setting the data broadcast program TS to maintain the same bandwidth as the first TS with a first setting subunit;

repeatedly multiplexing a TS packet generated from a local element onto the data broadcast program TS to eliminate any surplus, if a repeat multiplexing subunit determines if a TS packet surplus in a carousel cycle of the data broadcast program TS arises because the local element is smaller in size than a source element shown in the replacement list for replacement; and multiplexing any surplus TS packets generated from the local element onto the data broadcast program TS in a subsequent carousel cycle, if a cycle-delay packet multiplexing subunit determines if a TS packet shortage in a carousel cycle of the data broadcast program TS arises because the local element is larger in size than a source element shown in the replacement list for replacement.

4. A non-transitory computer-readable storage medium storing a computer program for transmitting a data broadcast program with a data broadcast program transport stream transmission device provided in a broadcast station, for (i) receiving a first transport stream having multiplexed thereon a first content that includes one or more source elements and (ii) transmitting a data broadcast program transport stream based on the received first TS, the computer program enabling a computer to execute the following steps of:

storing, in a judgment list storage unit, a judgment list that shows for each source element, whether the source element is for inclusion in a data broadcast program content of the broadcast station;

separately, in a separation judgment unit, each source element from the first TS, and judging in accordance with the judgment list whether the separated source element is for inclusion in the data broadcast program content;

outputting, in an output unit, the data broadcast program TS with the separated source element included in the data broadcast program content if the separation judgment unit judges in the affirmative; and storing, in a local element storage unit, one or more local elements produced in the broadcast station, wherein the judgment list storage unit further has a replacement list storage subunit;

storing a replacement list in the replacement list storage subunit, that shows the replacement of source elements judged to be for inclusion by the separation judgment unit with local elements stored in the local element storage unit, wherein the separation judgment unit further has a replacement judgment subunit;

judging when the replacement judgment subunit judges in the affirmative, to refer to the replacement list and to judge whether the separated source element is for replacement, sending, with a notification subunit, a replacement instruction to the output unit if the replacement judgment subunit judges in the affirmative, and the output unit has a reading subunit;

reading, with the reading subunit if a replacement instruction is received from the notification subunit, a local element indicated in the replacement instruction from the local element storage unit;

generating, with a generation output subunit, the data broadcast program TS based on local elements read by the reading subunit and source elements notified by the notification subunit, and outputting the generated data broadcast program TS;

setting the data broadcast program TS to maintain an equal number of elements transmitted per carousel cycle as the first TS with a second setting subunit;

multiplexing any surplus TS packets onto the data broadcast program TS as null packets, with a null packet multiplexing subunit, if a TS packet surplus in a carousel cycle of the data broadcast program TS arises because a local element is smaller in size than a source element shown in the replacement list for replacement; and inserting a TS packet generated from the local element onto the data broadcast program TS in the carousel cycle with an insert-packet multiplexing subunit, if a TS packet shortage in a carousel cycle of the broadcast program TS arises because a local element is larger in size than a source element shown in the replacement list for a replacement.

5. A distribution system including a distribution device that distributes a first contact and a transport stream transmission device provided in a broadcast station, and for (i) receiving a first transport stream having multiplexed thereon a first content that includes one or more source elements and (ii) transmitting a data broadcast program transport stream based on the received first TS, comprising a judgment list storage unit operable to store a judgment list that shows for each source element, whether the source element is for inclusion in a data broadcast program content of the broadcast station;

a separation judgment unit operable to separate each source element from the first TS, and to judge in accordance with the judgment list whether the separated source element is for inclusion in the data broadcast program content;

an output unit operable to output the data broadcast program TS with the separated source element included in the data broadcast program content if the separation judgment unit judges in the affirmative; and a local element storage unit operable to store one or more local elements produced in the broadcast station, wherein the judgment list storage unit further has:

a replacement list storage subunit operable to store a replacement list that shows the replacement of source elements judged to be for inclusion by the separation judgment unit with local elements stored in the local element storage unit, the separation judgment unit further has:

a replacement judgment subunit operable to, if the replacement judgment subunit judges in the affirmative, refer to the replacement list and judge whether the separated source element is for replacement, a notification subunit sends a replacement instruction to the output unit if the replacement judgment subunit judges in the affirmative, and the output unit has:

a reading subunit operable to, if a replacement instruction is received from the notification subunit, read a local element indicated in the replacement instruction from the local element storage unit;

a generation output subunit operable to generate the data broadcast program TS based on local elements read by the reading subunit and source elements notified by the notification subunit, and for outputting the generated data broadcast program TS;

a first setting subunit operable to set the data broadcast program TS to maintain the same bandwidth as the first TS;

a repeat multiplexing subunit operable to, if a TS packet surplus in a carousel cycle of the data broadcast program TS arises because a local element is smaller in size than a source element shown in the replacement list for replacement, repeatedly multiplex a TS packet generated from the local element onto the data broadcast program TS to eliminate the surplus; and a cycle-delay packet multiplexing subunit operable to, if a TS packet shortage in a carousel cycle of the data broadcast program TS arises because a local element is larger in size than a source element shown in the replacement list for replacement, multiplex any surplus TS packets generated from the local element onto the data broadcast program TS in a subsequent carousel cycle.

6. A method of transmitting a data broadcast program with data broadcast program transport stream transmission device provided in a broadcast station, for (i) receiving a first transport stream having multiplexed thereon a first content that includes one or more source elements and (ii) transmitting a data broadcast program transport stream based on the received first TS, comprising the steps of:

storing, in a judgment list storage unit, a judgment list that shows for each source element, whether the source element is for inclusion in a data broadcast program content of the broadcast station;

separately, in a separation judgment unit, each source element from the first TS, and judging in accordance with the judgment list whether the separated source element is for inclusion in the data broadcast program content;

outputting, in an output unit, the data broadcast program TS with the separated source element included in the data broadcast program content if the separation judgment unit judges in the affirmative; and storing, in a local element storage unit, one or more local elements produced in the broadcast station, wherein the judgment list storage unit further has a replacement list storage subunit;

storing a replacement list in the replacement list storage subunit, that shows the replacement of source elements judged to be for inclusion by the separation judgment unit with local elements stored in the local element storage unit, wherein the separation judgment unit further has a replacement judgment subunit;

judging when the replacement judgment subunit judges in the affirmative, to refer to the replacement list and to judge whether the separated source element is for replacement, sending, with a notification subunit, a replacement instruction to the output unit if the replacement judgment subunit judges in the affirmative, and the output unit has a reading subunit;

reading, with the reading subunit if a replacement instruction is received from the notification subunit, a local element indicated in the replacement instruction from the local element storage unit;

generating, with a generation output subunit, the data broadcast program TS based on local elements read by the reading subunit and source elements notified by the notification subunit, and outputting the generated data broadcast program TS;

setting the data broadcast program TS to maintain an equal number of elements transmitted per carousel cycle as the first TS with a second setting subunit;

multiplexing any surplus TS packets onto the data broadcast program TS as null packets, with a null packet multiplexing subunit, if a TS packet surplus in a carousel cycle of the data broadcast program TS arises because a local element is smaller in size than a source element shown in the replacement list for replacement; and inserting a TS packet generated from the local element onto the data broadcast program TS in the carousel cycle with an insert-packet multiplexing subunit, if a TS packet shortage in a carousel cycle of the broadcast program TS arises because a local element is larger in size than a source element shown in the replacement list for a replacement.

7. A non-transitory computer-readable storage medium storing a computer program for transmitting a data broadcast program with a data broadcast program transport stream transmission device provided in a broadcast station, for (i) receiving a first transport stream having multiplexed thereon a first content that includes one or more source elements and (ii) transmitting a data broadcast program transport stream based on the received first TS, the computer program enabling a computer to execute the following steps of:

storing, in a judgment list storage unit, a judgment list that shows for each source element, whether the source element is for inclusion in a data broadcast program content of the broadcast station;

separately, in a separation judgment unit, each source element from the first TS, and judging in accordance with the judgment list whether the separated source element is for inclusion in the data broadcast program content;

outputting, in an output unit, the data broadcast program TS with the separated source element included in the data broadcast program content if the separation judgment unit judges in the affirmative; and storing, in a local element storage unit, one or more local elements produced in the broadcast station, wherein the judgment list storage unit further has a replacement list storage subunit;

storing a replacement list in the replacement list storage subunit, that shows the replacement of source elements judged to be for inclusion by the separation judgment unit with local elements stored in the local element storage unit, wherein the separation judgment unit further has a replacement judgment subunit;

judging when the replacement judgment subunit judges in the affirmative, to refer to the replacement list and to judge whether the separated source element is for replacement, sending, with a notification subunit, a replacement instruction to the output unit if the replacement judgment subunit judges in the affirmative, and the output unit has a reading subunit;

reading, with the reading subunit if a replacement instruction is received from the notification subunit, a local element indicated in the replacement instruction from the local element storage unit;

generating, with a generation output subunit, the data broadcast program TS based on local elements read by the reading subunit and source elements notified by the notification subunit, and outputting the generated data broadcast program TS;

setting the data broadcast program TS to maintain an equal number of elements transmitted per carousel cycle as the first TS with a second setting subunit;

multiplexing any surplus TS packets onto the data broadcast program TS as null packets, with a null packet multiplexing subunit, if a TS packet surplus in a carousel cycle of the data broadcast program TS arises because a local element is smaller in size than a source element shown in the replacement list for replacement; and inserting a TS packet generated from the local element onto the data broadcast program TS in the carousel cycle with an insert-packet multiplexing subunit, if a TS packet shortage in a carousel cycle of the broadcast program TS arises because a local element is larger in size than a source element shown in the replacement list for a replacement.

8. A distribution system including a distribution device that distributes a first contact and a transport stream transmission device provided in a broadcast station, and for (i) receiving a first transport stream having multiplexed thereon a first content that includes one or more source elements and (ii) transmitting a data broadcast program transport stream based on the received first TS, comprising:
- a judgment list storage unit operable to store a judgment list that shows for each source element, whether the source element is for inclusion in a data broadcast program content of the broadcast station;
- a separation judgment unit operable to separate each source element from the first TS, and to judge in accordance with the judgment list whether the separated source element is for inclusion in the data broadcast program content;
- an output unit operable to output the data broadcast program TS with the separated source element included in the data broadcast program content if the separation judgment unit judges in the affirmative; and
- a local element storage unit operable to store one or more local elements produced in the broadcast station, wherein the judgment list storage unit further has:
- a replacement list storage subunit operable to store a replacement list that shows the replacement of source elements judged to be for inclusion by the separation judgment unit with local elements stored in the local element storage unit, the separation judgment unit further has:
- a replacement judgment subunit operable to, if the replacement judgment subunit judges in the affirmative, refer to the replacement list and judge whether the separated source element is for replacement,
- a notification subunit sends a replacement instruction to the output unit if the replacement judgment subunit judges in the affirmative, and the output unit has:
- a reading subunit operable to, if a replacement instruction is received from the notification subunit, read a local element indicated in the replacement instruction from the local element storage unit;
- a generation output subunit operable to generate the data broadcast program TS based on local elements read by the reading subunit and source elements notified by the notification subunit, and for outputting the generated data broadcast program TS;
- a second setting subunit operable to set the data broadcast program TS to maintain an equal number of elements transmitted per carousel cycle as the first TS;
- a null packet multiplexing subunit operable to, if a TS packet surplus in a carousel cycle of the data broadcast program TS arises because a local element is smaller in size than a source element shown in the replacement list for replacement, multiplex any surplus TS packets onto the data broadcast program TS as null packets; and
- an insert-packet multiplexing subunit operable to, if a TS packet shortage in a carousel cycle of the data broadcast program TS arises because a local element is larger in size than a source element shown in the replacement list for replacement, forcibly insert a TS packet generated from the local element onto the data broadcast program TS in the carousel cycle.

* * * * *